US009800377B2

(12) United States Patent
Bontu et al.

(10) Patent No.: US 9,800,377 B2
(45) Date of Patent: *Oct. 24, 2017

(54) SIMULTANEOUSLY ACCESSING SHARED RESOURCES

(71) Applicant: BlackBerry Limited, Waterloo (CA)

(72) Inventors: Chandra Sekhar Bontu, Nepean (CA); Mark E. Pecen, Waterloo (CA); Shalini Suresh Periyalwar, Toronto (CA); Yongkang Jia, Ottawa (CA)

(73) Assignee: BlackBerry Limited, Waterloo, Ontario (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/153,374

(22) Filed: May 12, 2016

(65) Prior Publication Data
US 2016/0261389 A1 Sep. 8, 2016

Related U.S. Application Data

(63) Continuation of application No. 13/839,974, filed on Mar. 15, 2013, now Pat. No. 9,369,247.

(51) Int. Cl.
- H04W 4/00 (2009.01)
- H04L 5/00 (2006.01)
- H04B 7/26 (2006.01)
- H04W 56/00 (2009.01)
- H04L 27/26 (2006.01)
- H04W 28/04 (2009.01)

(52) U.S. Cl.
CPC ......... *H04L 5/0037* (2013.01); *H04B 7/2621* (2013.01); *H04L 27/2678* (2013.01); *H04W 28/046* (2013.01); *H04W 56/00* (2013.01); *H04L 5/0094* (2013.01)

(58) Field of Classification Search
None
See application file for complete search history.

(56) References Cited

U.S. PATENT DOCUMENTS

| 8,817,726 B2* | 8/2014 | Seo ................... H04L 12/40026 370/329 |
| 9,301,282 B2* | 3/2016 | Lim .................. H04W 72/0413 |
| 2007/0014272 A1 | 1/2007 | Palanki |

(Continued)

FOREIGN PATENT DOCUMENTS

| EP | 1848121 | 10/2007 |
| EP | 2487976 | 8/2012 |

OTHER PUBLICATIONS

Sen et al. "Successive Interference Cancellation: Carving Out MAC Layer Opportunities"; IEEE Transactions on Mobile Computing, vol. 12, No. 2, Feb. 2013; 12 pages.

(Continued)

Primary Examiner — Kibrom T Hailu
(74) Attorney, Agent, or Firm — Fish & Richardson P.C.

(57) ABSTRACT

In some implementations, a method in a wireless network includes allocating a radio resource to a plurality of transmitters. The radio resource is configured for simultaneously transmitting and receiving user data with varying transmission delays. User data bursts are received, from the plurality of transmitters, with varying transmission delays transmitted over the allocated radio resource with varying resource identities.

35 Claims, 24 Drawing Sheets

(56) References Cited

U.S. PATENT DOCUMENTS

| | | | |
|---|---|---|---|
| 2007/0206531 A1 | 9/2007 | Pajukoski et al. | |
| 2007/0223614 A1* | 9/2007 | Kuchibhotla | H04L 1/1887 |
| | | | 375/267 |
| 2008/0159211 A1 | 7/2008 | Kwon et al. | |
| 2009/0086706 A1* | 4/2009 | Huang | H04L 1/0026 |
| | | | 370/349 |
| 2010/0020732 A1 | 1/2010 | Gaddam et al. | |
| 2010/0077272 A1 | 3/2010 | Peisa et al. | |
| 2010/0118991 A1* | 5/2010 | Lee | H04L 5/0094 |
| | | | 375/260 |
| 2012/0121031 A1* | 5/2012 | Tang | H04B 7/0691 |
| | | | 375/267 |
| 2012/0182983 A1* | 7/2012 | Stephens | H04W 28/06 |
| | | | 370/338 |
| 2012/0184206 A1* | 7/2012 | Kim | H04L 5/0091 |
| | | | 455/9 |
| 2012/0208545 A1 | 8/2012 | Yang et al. | |
| 2012/0236816 A1 | 9/2012 | Park | |
| 2013/0034069 A1* | 2/2013 | Uemura | H04W 74/0833 |
| | | | 370/329 |
| 2013/0148513 A1* | 6/2013 | Szabo | H04L 41/142 |
| | | | 370/252 |
| 2014/0064195 A1* | 3/2014 | Li | H04W 56/00 |
| | | | 370/329 |

OTHER PUBLICATIONS

International Search Report and Written Opinion of the International Searching Authority issued in International Application No. PCT/CA2013/050214 dated Dec. 9, 2013; 9 pages.

International Preliminary Report on Patentability in International Application No. PCT/CA2013/050214, dated Sep. 15, 2015, 6 pages.

Alcatel-Lucent; "Correction to Pading on RLC UM PDU Corresponding to MTCH/MCCH"; 3GPP TSG-RAN WG2 Meeting #80 (R2-125878); New Orleans, USA; Nov. 12-16, 2012; 3 pages.

Siemens; "HSDPA Signalling Requirements for TDD Mode"; TSG-RAN Working Group 2 Meeting #19 (R2-010429); Antipolis; Feb. 19-23, 2001; 6 pages.

Extended European Search Report issued in European Application No. 13878138.0 dated Sep. 23, 2016.

* cited by examiner

SIMULTANEOUSLY ACCESSING SHARED RESOURCES

CROSS REFERENCE TO RELATED APPLICATION

This patent is a continuation of U.S. application Ser. No. 13/839,974, filed Mar. 15, 2013, the entire contents of which are hereby expressly incorporated by reference herein in its entirety.

FIELD

This disclosure relates to simultaneously accessing shared resources.

BACKGROUND

Currently, the wireless spectrum is shared among users in different ways, but almost invariably, only one user is able to access the spectrum resource (as a time/frequency block) at a given time. Most of the existing wireless systems operate based on the frame-based protocol architecture. Furthermore, these existing systems are predominantly network controlled, thus require various signaling messages to perform the basic operations of packet data transmission and keeping in-sync with the frame timing. With the varying applications supported by wireless systems, sometimes, for some applications, the bandwidth used for signaling (to set up the connection, request resources, etc.) may be more than the bandwidth used for transmitting the actual data.

DETAILED DESCRIPTION

The present disclosure is directed to multiple solutions for providing a simultaneous-access shared channel to allow simultaneous access by more than one transmitter. Many of the examples provided in this disclosure are with respect to a 3GPP Long Term Evolution (LTE) based cellular network. However, the disclosed techniques are applicable to other existing cellular standards or other wireless networks having the capability of sharing radio resources among transmitters. In addition, the present disclosure focuses on a simultaneous access approach to uplink (UL) data transmission, this approach may be possible to configure a downlink (DL) channel with multiple network nodes transmitting to multiple user equipment (UE) simultaneously on the same resource and supported by UE receiver processing to separate the transmissions.

In some implementations, a special channel referred to as a Physical Uplink Shared Simultaneous-access Channel (PUS SCH) may be configured for simultaneous access to shared resources by more than one transmitter. In these instances, subsets of transmitters may be allocated different radio resource units (RRUs) in the PUS SCH. In addition, the network may incorporate receiver processing techniques, e.g., Multi User Detection (MUD) or Successive Interference Cancellation (SIC), to separate multiple transmissions on a single resource. When two or more transmitters are assigned to the same resource, the transmitters may transmit simultaneously while applying physical layer or cross layer receiver processing at the receiver to separate the transmissions, which may eliminate, minimize, or otherwise reduce the impact of transmission collisions. In addition, the simultaneous transmissions may arrive at the receiver out-of-sync with the subframe timing within a configured time window. In these instances, MUD or SIC or such other techniques may be modified or augmented to decode the asynchronous simultaneous reception on the same radio resources.

Using the PUSSCH as described in this disclosure may provide one or more advantages. For example, the PUSSCH may eliminate or otherwise reduce, after initial allocation of the PUSSCH, signalling to grant resources. Also, no additional signalling/procedures may be transmitted to maintain UL synchronization. Defining classes of transmitters that are allocated to different PUS SCH resources and through proper frame format design including preamble allocation may enable a degree of contention avoidance. In some implementations, receiver processing may provide successful detection of simultaneous transmission from multiple transmitters. Further, a narrowband version may operate with low cost transmitters. The operator may deploy (one of or) a combination of contention free uplink shared channels and PUSSCH to suit the demands of the traffic in the respective receivers. PUSSCH for GPRS/EDGE or HSDPA transmissions may also be defined.

Figure 1:
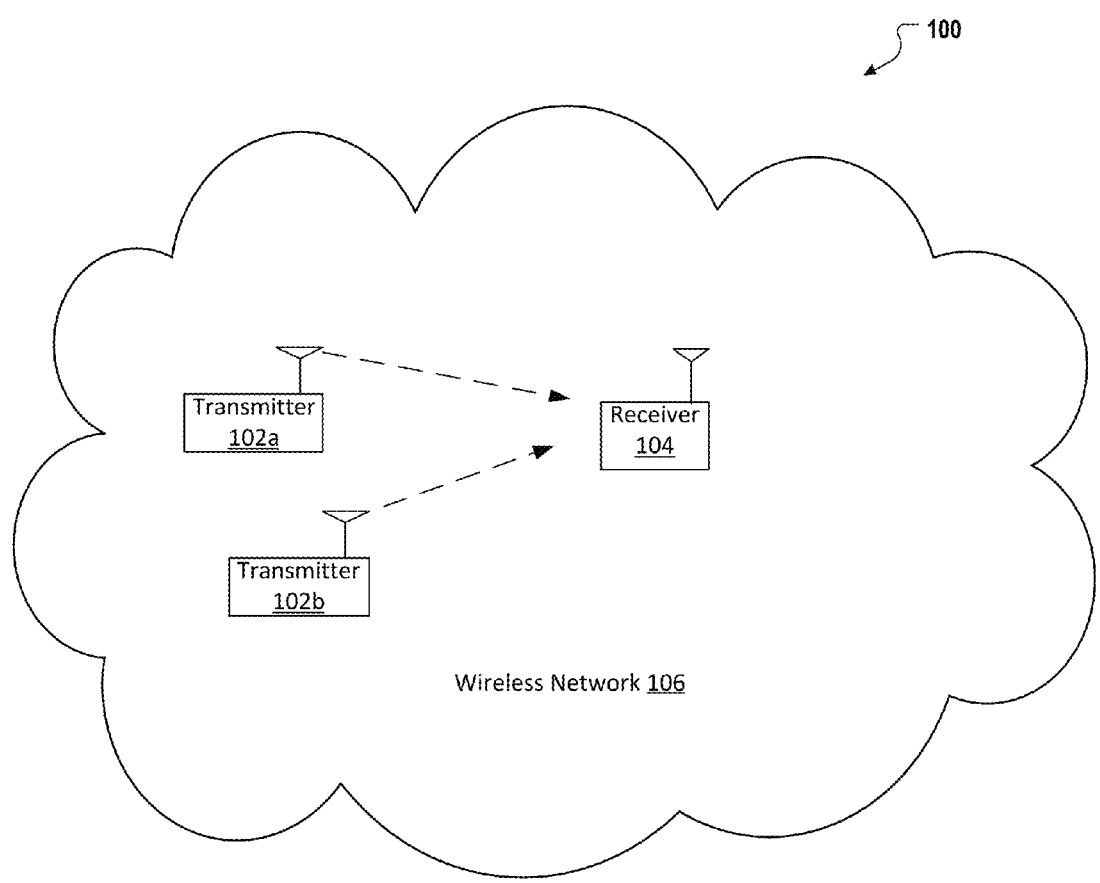
FIG. 1 is a schematic block diagram of an example mobile communication system.

FIG. 1 is an example wireless communication system 100 for simultaneous access to a shared resource. In the illustrated implementations, the wireless communication system 100 includes transmitters 102a and 102b communicably coupled to a receiver 104 through a wireless network 106. In some implementations, the transmitters 102a and 102b are allocated shared resources in the wireless network 106 and transmit data packet burst to the receiver 104 using the shared resource. A data packet burst may be one or more transmissions. To avoid collisions in the shared resource or separate multiple transmissions in the shared resource, the receiver 104 may allocate, assign, or otherwise identify one or more of the following: preambles; available preambles; reserved preambles; locations within preambles; status reports for transmissions; sets of the shared resources; selection criteria for the shared resources; thresholds for different selection criteria; or other information. By providing simultaneous access transmissions to shared resources, the system 100 may optimize or otherwise enhance bandwidth usage. In some implementations, the system 100 may allocate a PUSSCH that can carry data for small infrequent or periodic transmissions. The PUSSCH is a shared channel configured for simultaneously transmitting user data on shared resources with varying transmission delays. By allocating a PUSSCH, the system 100 may provide or enable one or more of the following: multiple transmitters allocated to the same radio resource for simultaneous access; less signalling for resource allocation since allocations are not always strictly made per receiver; accommodation of variability in transmission timing requirements; a mechanism for receivers to allocate resources to transmitters from either or both contention free uplink-shared-channel mode and PUSSCH mode depending on offered traffic type; and multiple schemes of simultaneous access.

The transmitters 102a and 102b may be any electronic device configured to wirelessly transmit, for example, within the mobile communication system 100. The transmitters 102a and 102b may transmit voice data, video data, user data, application data, multimedia data, text, web content, or any other content. In some implementations, the transmitter 102a and 102b may be allocated of a shared radio resource from the receiver 104 or the wireless network 106. For example, the transmitters 102a and 102b may receive a broadcast of radio-resource assignments or availability of radio resources including the radio resource and associated selection criteria for transmitters 102a and 102b. In some implementations, the assignments may be transmitted using dedicated signals. Regardless, the assignments or availability of radio resources may include or otherwise identify at least one of shared radio resources, associated selection criteria, preambles, or locations of preambles within a payload. The transmitters 102a and 102b may use the selection criteria to select at least one of a subset of the shared radio resources, a preamble, or a location for the preamble with the payload. The selection criteria may be based on at least one of received signal power, received signal to noise plus interference ratio, a transmitter location, a transmitter speed, or an application descriptor. In the event the selection criteria include an application descriptor, the application descriptor may include at least one of an indication of an expected application packet or a packet session length and a packet or a packet session arrival rate. In addition, the indication may be based on at least one of a mean packet length, variance, or maximum packet length, and the packet or the packet session arrival rate may be based on at least one of a mean arrival rate, a variance of packet arrival rate, or maximum inter-packet arrival time. In some implementations, selection criteria may include one or more thresholds, and the transmitters 102a and 102b may use the one or more thresholds to select a set of radio resources from the shared radio resources.

In some implementations, the transmitters 102a and 102b may form, for a user data burst, at least one of a radio link control protocol data unit (RLC PDU), a medium access control PDU (MAC PDU), a physical layer PDU (PHY PDU), or a Single Carrier-Frequency Division Multiple Access (SC-FDMA) symbol. In some instances, the transmitters 102a and 102b may initially form a MAC PDU from an RLC PDU, a UE identifier (UE ID), a new data bit indicator for identifying whether the data is being retransmitted, and a cyclic redundancy check (CRC) and subsequently form a PHY PDU using the MAC PDU. When a PHY PDU is formed, the transmitter 102a, 102b may form a burst of data packets within a subframe duration based on the PHY PDU and spread preamble bits of at least one preamble across the burst of data packets. When a MAC PDU is formed, the transmitter 102a, 102b may form a burst of SC-FDMA symbols and, for each the SC-FDMA symbol, include a guard period, a cyclic prefix (CP), and a payload. In these instances, the transmitter 102a, 102b may include the preamble in at least a subset of the SC-FDMA symbols. When the transmitter 102a, 102b is stationary, the transmitter 102a, 102b may add a standard (CP) to the SC-FDMA symbols, and, when the transmitter 102a, 102b is moving, the transmitter 102a, 102b may add an extended CP larger than the standard CP to the SC-FDMA symbols. In addition, the transmitter 102a, 102b may apply a forward error control (FEC) coding to the user data burst. In some implementations, the transmitter 102a, 102b may transmit an indication whether the radio resource is reserved for one or more subsequent transmissions. After transmitting the user data burst, the transmitter 102a, 102b may monitor transmissions for a receive status and retransmit the user data burst if the previous transmission was not received. When retransmitting, the transmitter 102a, 102b may use the same or different radio resource, preamble, or preamble location.

The receiver 104 may be any electronic device configured to wirelessly receive, for example, within the mobile communication system 100. The receiver 104 may receive voice data, video data, user data, application data, multimedia data, text, web content, or any other content. In some implementations, the receiver 104 is configured to receive, from the transmitters 102a and 102b, user data bursts with varying transmissions delays transmitted over the shared radio resource with varying resource identities. The receiver 104 may receive multiple transmissions in a shared resource and separate the multiple transmissions using, for example, at least one of MUD, SIC, based on maximum likelihood detection (MLD) criteria or in general any other optimization criteria. In some implementations, the receiver 104 can receive a burst of data packets within a subframe duration with preamble bits of at least one preamble spread across the burst of data packets and reconstruct a PHY PDU based on the burst of data packets. As previously mentioned, the receive 104 may be configured to receive transmissions on a PUSSCH. In these instances, the receiver 104 may receive, from the transmitter 102a, 102b, a SC-FDMA/OFDMA symbol(s) in the PUSSCH with a standard CP of a specified size indicating the first transmitter is stationary or an extended CP larger than the standard CP indicating the second transmitter is moving. In some implementations, the receiver 104 may receive a burst of SC-FDMA/OFDMA symbols including a guard period, a CP, and a payload, and a subset of the SC-FDMA symbols may include a preamble. Based on the received SC-FDMA/OFDMA symbols, the receiver 104 may reconstruct a single MAC PDU. A similar detection procedure can be performed when the transmission is in time domain, e.g., TDMA.

In some implementations, the wireless network 106 may allocate the shared resources. In these instances, a network node different from the receiver 104 or the receiver 104 may allocated the shared resource. For example, in addition to wireless reception, the receiver 104 may be configured to also wirelessly transmit within the mobile communication system 100. For example, the receiver 104 may transmit allocations, assignments or availabilities to the transmitters 102a and 102b. For example, receiver 104 may transmit a broadcast of radio-resource assignments or availability of radio resources including the radio resource and associated selection criteria. In some implementations, the assignments may be transmitted using dedicated signals. As previously mentioned, the assignments or availability of radio resources may include or otherwise identify at least one of shared radio resources, associated selection criteria for the plurality of transmitters, preambles, or positions of preambles within a payload.

The transmitter 102a or 102b or the receiver 104 may be user equipment, a network node, or other device in the wireless communication system 100. For user equipment, the transmitter 102a or 102b or the receiver 104 may be referred to as mobile electronic device, user device, mobile station, subscriber station, portable electronic device, mobile communications device, wireless modem, or wireless terminal. Examples of user equipment may include a cellular phone, personal data assistant (PDA), smart phone, laptop, tablet personal computer (PC), pager, portable computer, portable gaming device, wearable electronic device, or other mobile communications device having components for communicating voice or data via a mobile communication network.

Other examples include, but are not limited to, a television, a remote controller, a set-top box, a computer monitor, a computer (including a tablet, a desktop computer, a handheld or laptop computer, a netbook computer), a microwave, a refrigerator, a stereo system, a cassette recorder or player, a DVD player or recorder, a CD player or recorder, a VCR, an MP3 player, a radio, a camcorder, a camera, a digital camera, a portable memory chip, a washer, a dryer, a washer/dryer, a copier, a facsimile machine, a scanner, a multi-functional peripheral device, a wristwatch, a clock, and a game device, etc. The transmitter 102a or 102b or the receiver 104 may include a device and a removable memory module, such as a Universal Integrated Circuit Card (UICC) that includes a Subscriber Identity Module (SIM) application, a Universal Subscriber Identity Module (USIM) application, or a Removable User Identity Module (R-UIM) application.

The wireless network 106 may communication based on orthogonal frequency division multiplexing (OFDM), orthogonal frequency division multiple access (OFDMA), space-division multiplexing (SDM), frequency-division multiplexing (FDM), time-division multiplexing (TDM), code division multiplexing (CDM), or others. The wireless network 106 may transmit information using MAC and PHY layers. Communications within the wireless network 106 may be transmitted in accordance with Long Term Evolution (LTE) Global System for Mobile Communication (GSM) protocols, Code Division Multiple Access (CDMA) protocols, Universal Mobile Telecommunications System (UMTS), Unlicensed Mobile Access (UMA), direct device-to-device (DD2D) protocols, or others.

Figure 2:
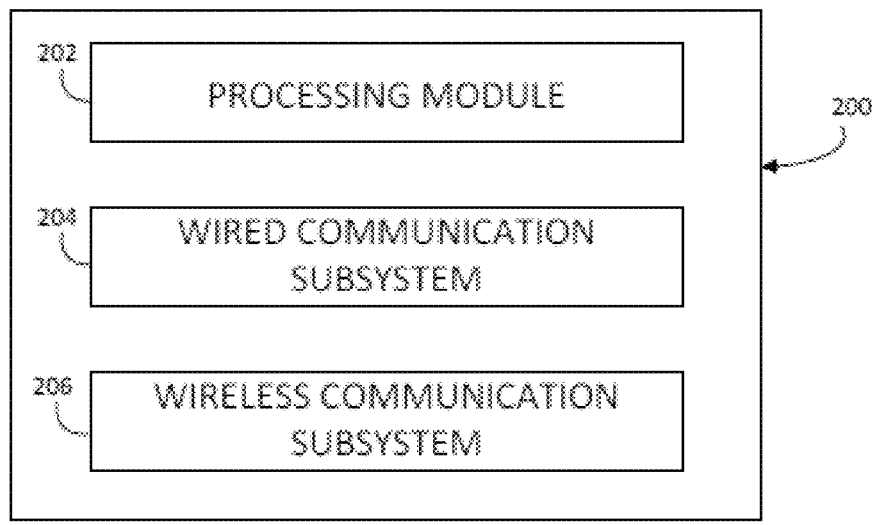
FIG. 2 is a schematic illustrating an example network node.

FIG. 2 is a schematic illustrating an example network node 200. As mentioned with regard to FIG. 1, the network node 200 may be an example of the transmitter 102a or 102b or the receiver 104. The example network node 200 includes a processing module 202, a wired communication subsystem 204, and a wireless communication subsystem 206. The processing module 202 can include one or more processing components (alternatively referred to as "processors" or "central processing units" (CPUs)) operable to execute instructions associated with managing inter-device communications. The processing module 202 can also include other auxiliary components, such as random access memory (RAM), read only memory (ROM), secondary storage (for example, a hard disk drive or flash memory). The processing module 202 can execute certain instructions and commands to provide wireless or wired communication, using the wired communication subsystem 204 or a wireless communication subsystem 206. A skilled artisan will readily appreciate that various other components can also be included in the example network node 200.

Figure 3:
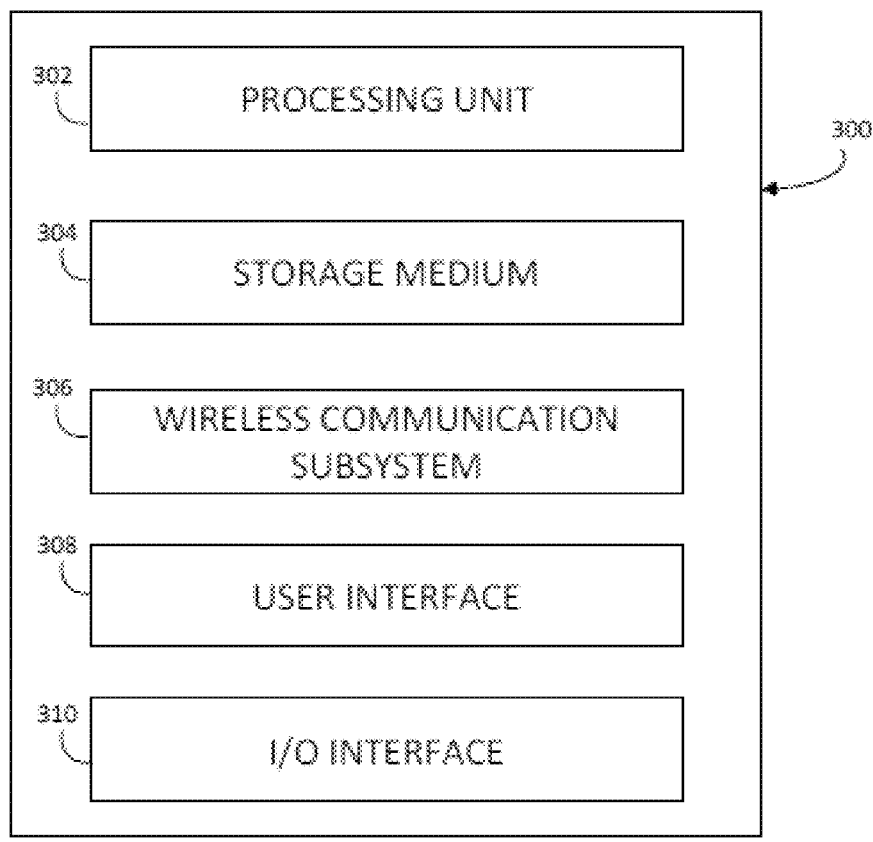
FIG. 3 is a schematic illustrating an example user equipment device.

FIG. 3 is a schematic illustrating an example UE 300. As mentioned with regard to FIG. 1, the UE 300 may be an example of the transmitter 102a or 102b or the receiver 104. The example UE 300 includes a processing unit 302, a computer readable storage medium 304 (for example, ROM or flash memory), a wireless communication subsystem 306, an interface 308, and an I/O interface 310. The wireless communication subsystem 306 may be configured to provide wireless communications for data information or control information provided by the processing unit 302. The wireless communication subsystem 306 can include, for example, one or more antennas, a receiver, a transmitter, a local oscillator, a mixer, and a digital signal processing (DSP) unit. In some embodiments, the wireless communication subsystem 306 can support advanced multi-user detection (MUD) receivers and multiple input multiple output (MIMO) transmissions.

The interface 308 can include, for example, one or more of a screen or touch screen (for example, a liquid crystal display (LCD), a light emitting display (LED), an organic light emitting display (OLED), a microelectromechanical system (MEMS) display), a keyboard or keypad, a trackball, a speaker, and a microphone. The I/O interface 310 can include, for example, a universal serial bus (USB) interface. A skilled artisan will readily appreciate that various other components can also be included in the example UE device 300. The interface 308 may be a hardware interface that permits/facilitates communication between two devices.

Figure 4:
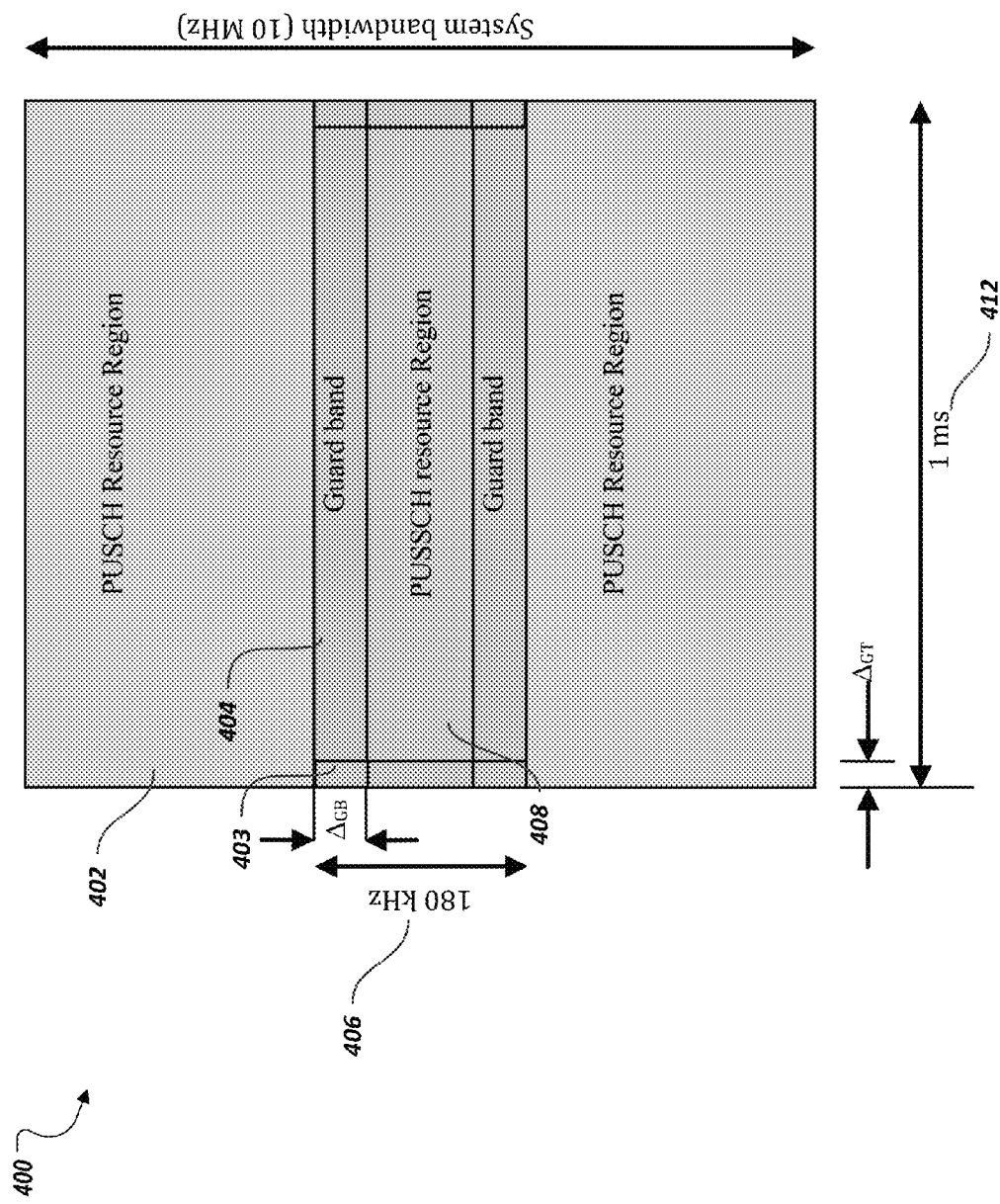
FIG. 4 is a schematic illustrating an example of a resource unit for a Physical Uplink Shared Simultaneous-access Channel (PUSSCH) in an LTE environment.

FIG. 4 is a schematic illustrating an uplink resource 400 including an example basic resource unit 406 for a PUSSCH in an LTE environment. In some implementations, a UE may be granted, assigned, or otherwise allocated any multiple of the basic radio resource unit 406. As previously mentioned, the PUSSCH and the basic resource unit 406 may be implemented in other types of wireless networks without departing from the scope of the disclosure. As illustrated, the uplink resource 400 includes a Physical Uplink Shared Channel (PUSCH) resource region 402 occupying frequency ranges above and below the basic resource unit 406 for the PUS SCH. As previously mentioned, a basic resource unit 408 in a PUS SCH may be referred to as a Radio Resource Unit (RRU). In the illustrated implementation, the RRU 406 includes a guard time ($\Delta_{GT}$) 403, a guard band ($\Delta_{GB}$) 404, and a PUSSCH resource region 408. In some implementations, the PUSSCH resource region 408 represents the uplink frequency and time resources where user data is transmitted on the RRU 406. In the illustrated implementation, the RRU 406 has a bandwidth of 180 kHz in a milliseconds (ms) but the RRU 406 may have another bandwidth without departing from the scope of the disclosure. As illustrated, a is a time duration 412 set to 1 ms but the time duration 412 may be set to a different length without departing from the scope of the disclosure.

The guard time 403 and the guard band 404 are regions of time and frequency where no data is transmitted because the UL timing of a UE may drift if the packet transmission is sporadic. In these instances, the UE may validate DL synchronization (frequency and timing) prior to UL transmissions in the PUSCH region 402. DL synchronization may be validated by the UE detecting the DL pilot/reference signal transmission, which is broadcast in every subframe, or other DL reference signals such as primary synchronization signal (PSS) or the secondary synchronization signal (SSS). In general, the UE can monitor the narrow band downlink transmissions to ascertain the DL synchronization. In some implementations, the guard time 403 and the guard band 404 may be configured based on the deployment scenario. For example, if the wireless system is operating on a lower frequency band such as 700 MHz, then a larger guard time 403 may be provisioned such that a UE at a cell edge can fall within the allocated time-frequency space depicted. For other radio access technologies (e.g., UMTS), a can be adjusted such that the above conditions are satisfied with respect to that RAT's frame structure. For static UEs, the guard time may be minimized, since measured downlink synchronization is not likely to drift substantially over the course of the UE's transmission.

Figure 5:
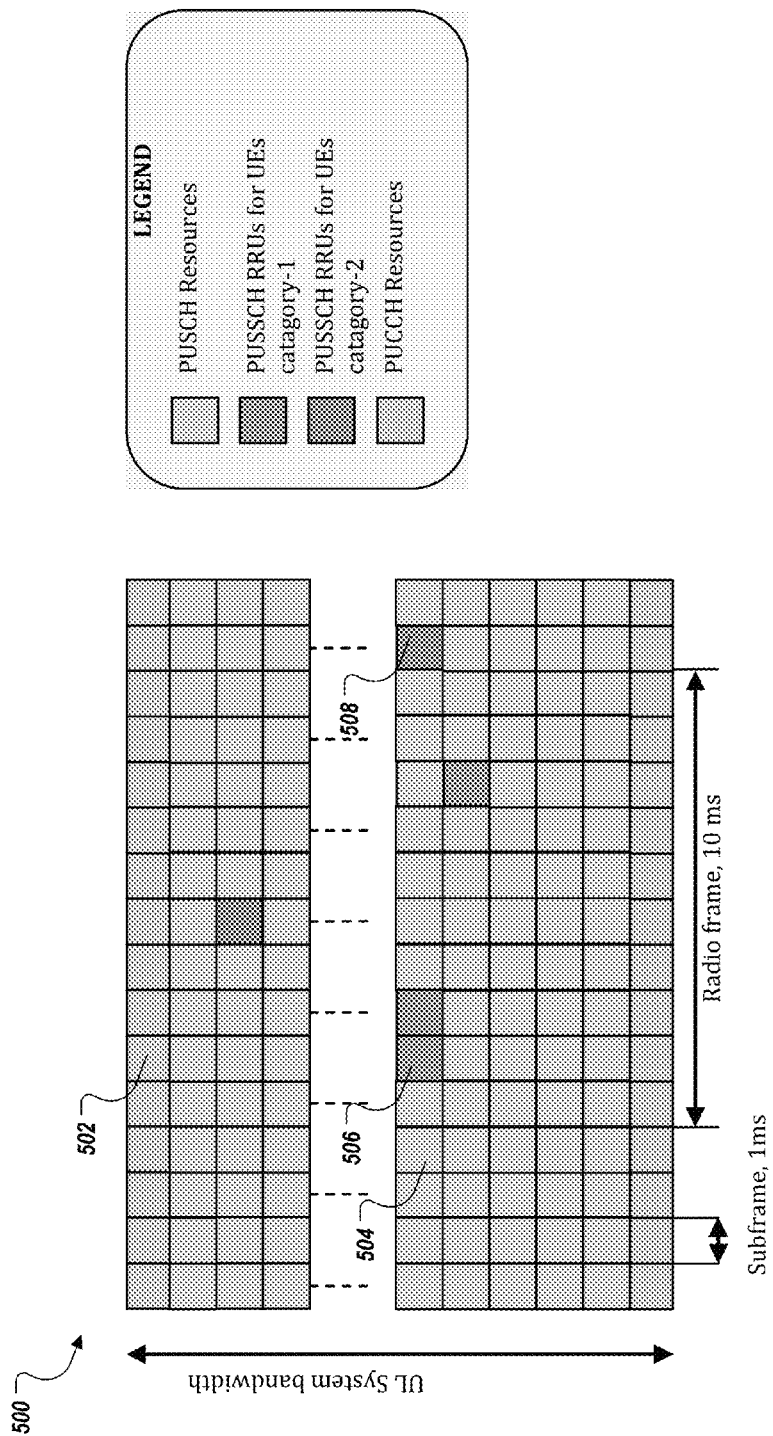
FIG. 5 is a schematic illustrating an example of an allocation of Radio Resource Units (RRUs) for a PUSSCH in an LTE environment.

FIG. 5 is a schematic 500 illustrating an example allocation for a PUSSCH in an LTE environment. The schematic 500 includes PUCCH resources 502, PUSCH resources 504, and PUSSCH RRUs 506 and 508. The RRUs 506 may be allocated to UEs in a first category, and the RRUs 508 may be allocated to UEs in a second category. A category may be based on a UE location, a UE speed, a UE signal quality, a type of network-node receiver, application type or other criteria. Different categories of UEs may be defined and allocated different RRUs as to minimize, eliminate, or otherwise reduce collisions. In some cases, a collision may occur if more than one UE selects the same RRU and the same PUSSCH parameters (e.g., preamble/pilot sequence). As illustrated, the PUSSCH RRUs 506 and 508 may be interspersed within the PUSCH resources 504. For example, the PUSSCH RRUs 506 and 508 may be scheduled to avoid corruption of PUSCH transmission through, for example, collisions of RRUs 506 or 508. In addition, the number of allocated PUSSCH RRUs 506, 508 may span multiple PUSCH resource blocks (RBs), and the network node may vary the number of RRUs 506, 508 according to anticipated or observed traffic. For example, the number may be varied based on anticipated or observed traffic that can be supported by the simultaneous access mechanism employing the PUSSCH. In some implementations, a narrowband transceiver configuration tailored to the data transmission region shown in FIG. 4 and FIG. 5 may be utilized.

To implement the PUSSCH as described with respect to FIGS. 4 and 5, one or more of the following design heuristics may be implemented: link adaptation; radio link control (RLC) segmentation; or UE power saving. In regard to link adaptation, the UEs may transmit PUSSCH using robust modulation and coding. In doing so, the requirement of UEs listening to the link adaptation commands from the eNB and the need for transmitting channel quality indicator (CQI) reports to the serving cell may be eliminated, minimized, or otherwise reduced. On the UL, the UEs may perform fractional open loop power control, and no specific or reduced power adjustments commands from the serving cell may be issued. If the UE application executes burst of small packets followed by long pauses (and further requires an information exchange on DL), slow link adaptation using in-band signaling (assuming the UEs are stationary or moving slowly) may be enabled. In some implementations, the UE can decide the modulation and coding scheme based on the path-loss. When doing so, the UE may assume that the network is well-calibrated and the cells can broadcast the relation between the path-loss and the preferred modulation and coding scheme (MCS) schemes. In regard to RLC segmentation, the overhead and control signaling may be eliminated, minimized, or otherwise reduced by using the RLC transport mode (RLC-TM) or RLC unacknowledgement mode (RLC-UM) mode since application data packets sent over PUSSCH are generally expected to be small (e.g., around 10 octets). In regard to UE power saving, UEs may be largely dormant and wake up only for the PUSSCH transmissions in order to reduce the power consumption in UEs using PUSSCH exclusively.

FIGS. 6-10 are example schematics 600-1000 directed to simultaneous access using a PUSSCH. Upon a UE registering with a wireless network (e.g., LTE network), a network node may identify an application running on the UE that can be supported by the PUS SCH. In LTE implementations, the evolved packet core (EPC) may notify the UE to the resources allocated to the PUS SCH. In some instances, the same set of resources and periodicity may be assigned to all (or classes of) UEs without, for example, knowing the real needs of the UEs. In comparison to a random access channel which is used for attaining UL synchronization, the PUS SCH may carry user data and optionally carry control information in addition to user data.

Figure 6:
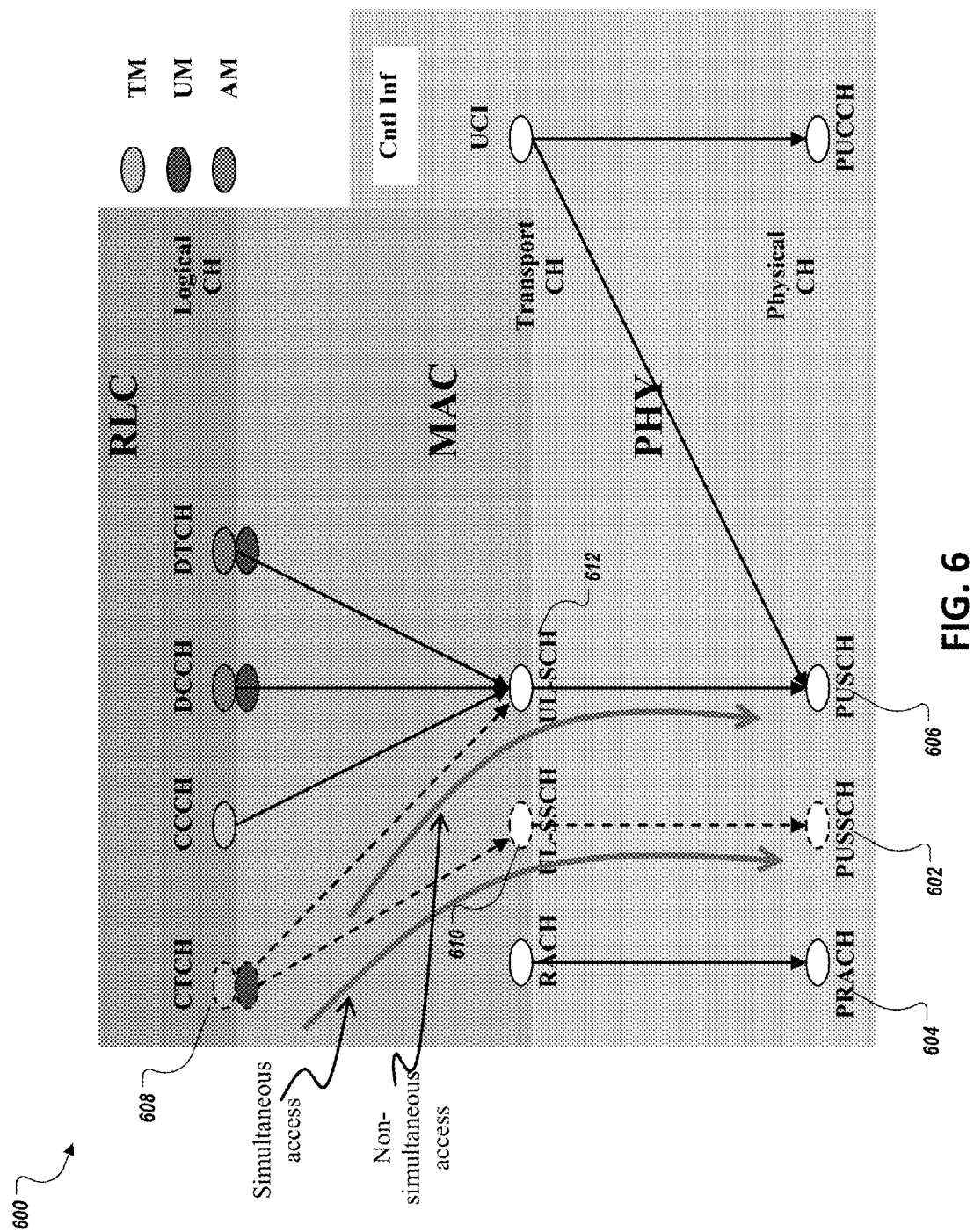
FIG. 6 is a schematic illustrating an example of a logical channel mapping for a PUS SCH.

In regard to FIG. 6, the schematic 600 is an example of a logical channel mapping for a PUS SCH. The specific format of the PUS SCH 602, as defined in the following sections, may enable a simultaneous-access shared channel capable an eNB to detect each individual data packet from the simultaneously transmitting UEs. For example, following 3GPP (or in general ETSI) terminology, the PUS SCH 602 may be a physical UL channel which can be mapped to a logical channel Common Traffic Channel (CTCH) 608 as illustrated in the schematic 600. addition, the data may be transmitted in Transparent Mode (TM) or Unacknowledged Mode (UM) over the Up Link Simultaneous-access Shared Channel (UL-SSCH) transport channel 610. The data packets which are larger may be transmitted using UM. The network operator may allocate suitable transmissions to the UL-SSCH 610 while other transmissions are allocated on the Up Link Shared Channel (UL-SCH) 612 of the PUSCH 606. Some data traffic may be assigned to CTCH 608 based on the quality of service (QoS) requirement. The CTCH data may be transported using either the UL-SSCH 610 or a contention free UL-SCH 612.

Figure 7:
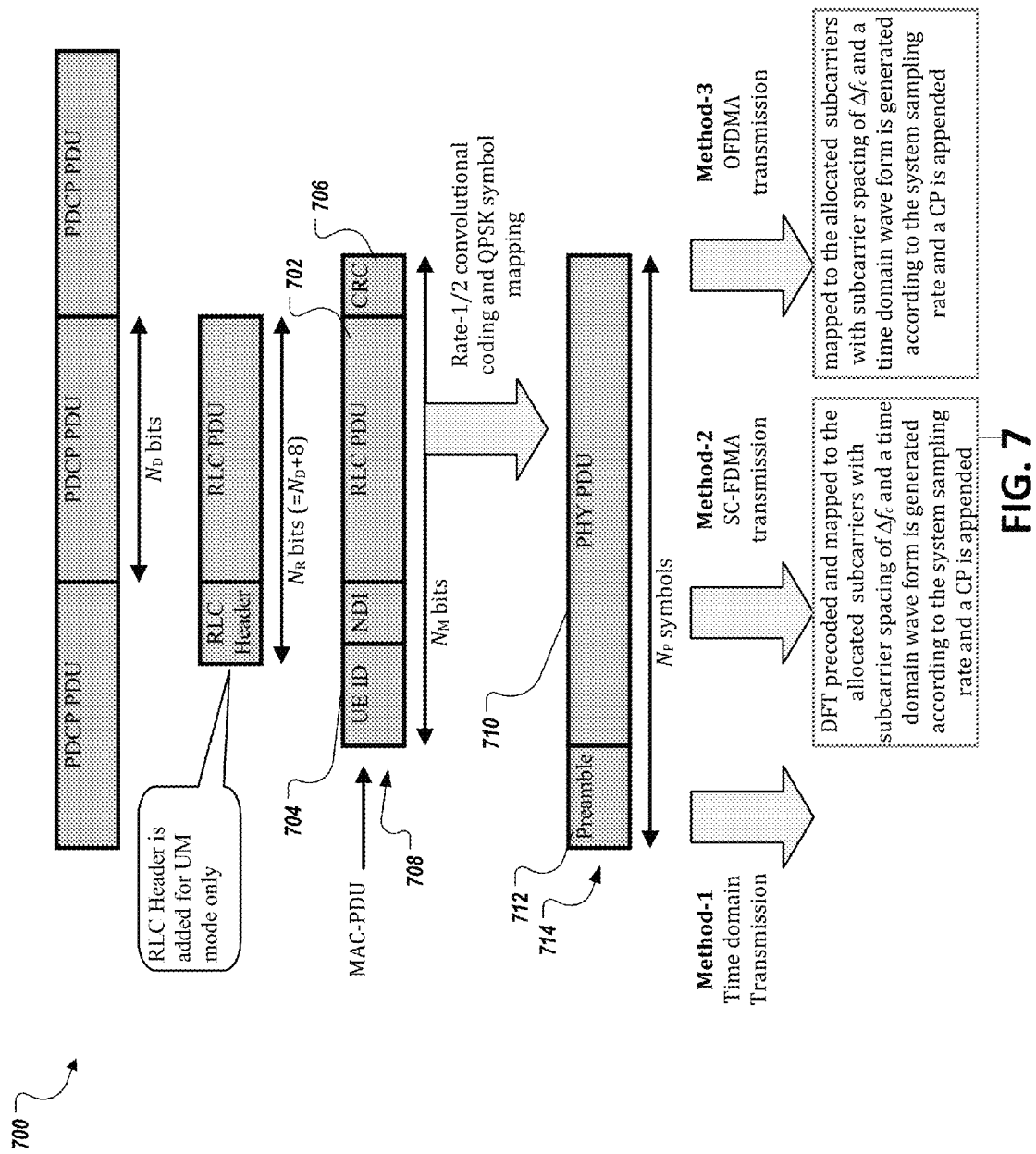
FIG. 7 is a schematic illustrating an example of a PUSSCH payload transmission format.

FIG. 7 is a schematic 700 illustrating an example of a PUSSCH payload transmission format. In general, the schematic 700 depicts the data transmitted over the RRUs allocated for the PUSSCH. Initially, a Medium Access Control (MAC) Protocol Data Unit (PDU) 708 is generated using a Radio Link Control (RLC) PDU 702, and a physical layer (PHY) PDU 710 is generated using the MAC PDU 708. In particular, the RLC PDU 702 is appended with a MAC header 704 that consists of a UE identifier (ID) and a new data indicator (NDI) bit. A cyclic redundancy check (CRC) 706 is calculated and appended to the payload 702 (together with the UE ID and the NDI bit 704) to form a MAC PDU 708. The MAC PDU 708 is rate-1/2 convolutional coded and symbol mapped to QPSK symbols to generate a PHY PDU 710. A preamble sequence 712 of 24 symbols is appended to form the physical layer payload 714. The physical layer payload 714 may be transmitted in a TDMA format, in a SC-FDMA format, an OFDM format or any other transmission format.

For TDMA transmissions, a MAC service data unit (SDU) may be formed by attaching a Packet Data Convergence Protocol (PDCP) header. The PDCP header may be omitted if the PDCP SDU is small and doesn't require segmentation. The MAC PDU 708 may be obtained by adding a small MAC header 704, which consist of a temporary UE ID, NDI bit, and other information. The temporary UE ID may be assigned by the serving cell (e.g., eNB/MME). The UE ID may be appended to a physical layer payload or inserted in as a MAC header 704. The New Data Indicator (NDI) field indicates whether the PUSSCH contains new data or retransmitted data. The NDI bit is set to '1' when the MAC PDU is retransmitted, i.e. HARQ is enabled. For example, the NDI bit may be set to 0 or 1 to indicate an original transmission or a retransmission, respectively. A CRC 706 is appended to the MAC PDU 704 before FEC coding and symbol mapping to form the physical layer payload 714. A preamble sequence is added to the physical layer payload 714 before transmitting the burst over the air. The preamble/pilot sequence may be selected from a set of sequences with good auto-correlation and cross correlation properties (in the time and/or frequency domain). For SC-FDMA transmissions, the physical layer payload 714 is discrete Fourier transform (DFT) precoded, sub-carrier mapped, and transmitted in the time domain after a CP is appended. For OFDM transmissions, the physical layer payload 714 is mapped to the allocated subcarriers and transmitted in the time domain after appending a CP.

To implement the PUSSCH as described with respect to FIGS. 6 and 7, one or more of the following design heuristics may be implemented: link adaptation; radio link control (RLC) segmentation; or UE power saving. In regard to link adaptation, the UEs may transmit PUSSCH using robust modulation and coding. In doing so, the requirement of UEs listening to the link adaptation commands from the eNB and the need for transmitting channel quality indicator (CQI) reports to the serving cell may be eliminated, minimized, or otherwise reduced. On the UL, the UEs may perform fractional open loop power control, and no specific or reduced power adjustments commands from the serving cell may be issued. If the UE application executes burst of small packets followed by long pauses (and further requires an information exchange on DL), slow link adaptation using in-band signaling (assuming the UEs are stationary or moving slowly) may be enabled. In some implementations, the UE can decide the modulation and coding scheme based on the path-loss. When doing so, the UE may assume that the network is well-calibrated and the cells can broadcast the relation between the path-loss and the preferred modulation and coding scheme (MCS) schemes. In regard to RLC segmentation, the overhead and control signaling may be eliminated, minimized, or otherwise reduced by using the RLC transport mode (RLC-TM) or RLC unacknowledgement mode (RLC-UM) mode since application data packets sent over PUSSCH are generally expected to be small (e.g., around 10 octets). In regard to UE power saving, UEs may be largely dormant and wake up only for the PUSSCH transmissions in order to reduce the power consumption in UEs using PUSSCH exclusively.

Figure 8A:
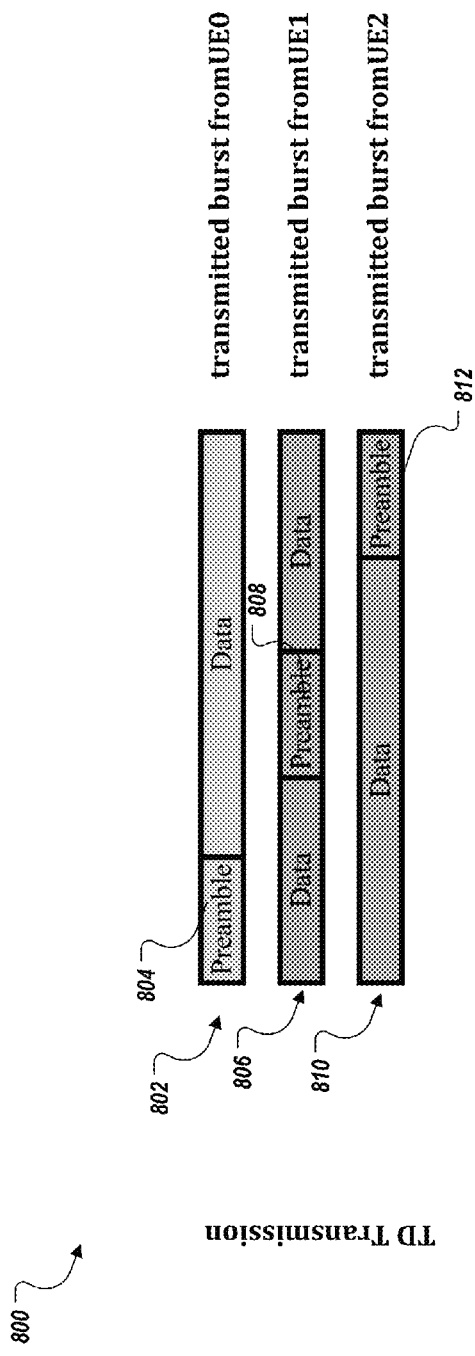
FIGS. 8A-B are schematics illustrating examples of a preamble/pilot sequence placement within a burst.
Figure 8B:
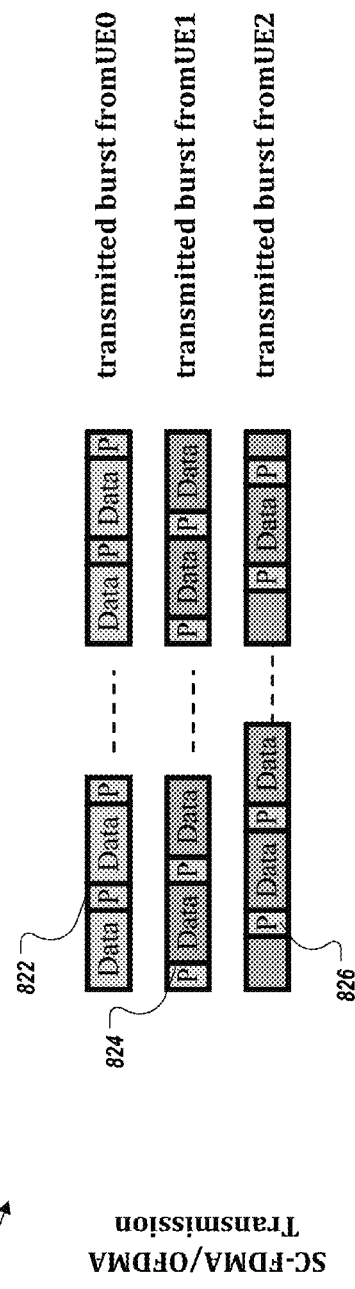

FIGS. 8A and B are schematics 800 and 820 illustrating examples of a preamble or pilot sequence placement within a burst. In regard to FIG. 8, the schematic 800 illustrates preamble placement within a Time Division (TD) transmission. As illustrated, the schematic includes a transmission 802 with a preamble 804, a transmission 806 with a preamble 808, and a transmission 810 with a preamble 812. In fact, the preamble 804, 808, and 812 are the same preamble. In other words, the network assigns the UE0, UE1, and UE2 the same preamble. In order to separate multiple transmissions in the same resource with the same preambles, the location of the preamble or pilot sequence in the frame format may be varied for the different UEs. In some instances, the preambles or pilot sequences do not overlap. As illustrated, the preamble 804 is at a first time duration, the preamble 808 of transmission 806 occurs at a second time duration, and the preamble 812 of transmission 810 occurs at a third time duration. The first, second, and third time duration do not overlap. Arranging the preambles 804, 808, and 812 to not overlap may allow a network node to allocate the same preamble to different UEs within the same resource as well as allow the network node to detect the non-overlapping preambles. The receiver processing for such an arrangement is discussed later in the present disclosure. In regard to FIG. 8B, the schematic 820 illustrates preamble placement within a SC-FDMA/OFDMA transmission. In order to separate multiple transmissions in the same resource with the same preambles, the preamble symbols may be interleaved with the data symbols. For example, the preamble or pilot symbols 822, 824, and 826 may be placed after every $N_s$ data symbols, where $N_s = N_p/N_{preamble}$. $N_p$ and $N_{preamble}$ represent the number of modulation symbols and the number of preamble/pilot symbols in an OFDM symbol, respectively.

In some implementations, the UE may adjust UL transmission timing based on the DL reception timing. If the drift in the UL timing is less than the length of the preamble (and preamble position offset), the preamble sequences may partially overlap.

Figure 9:
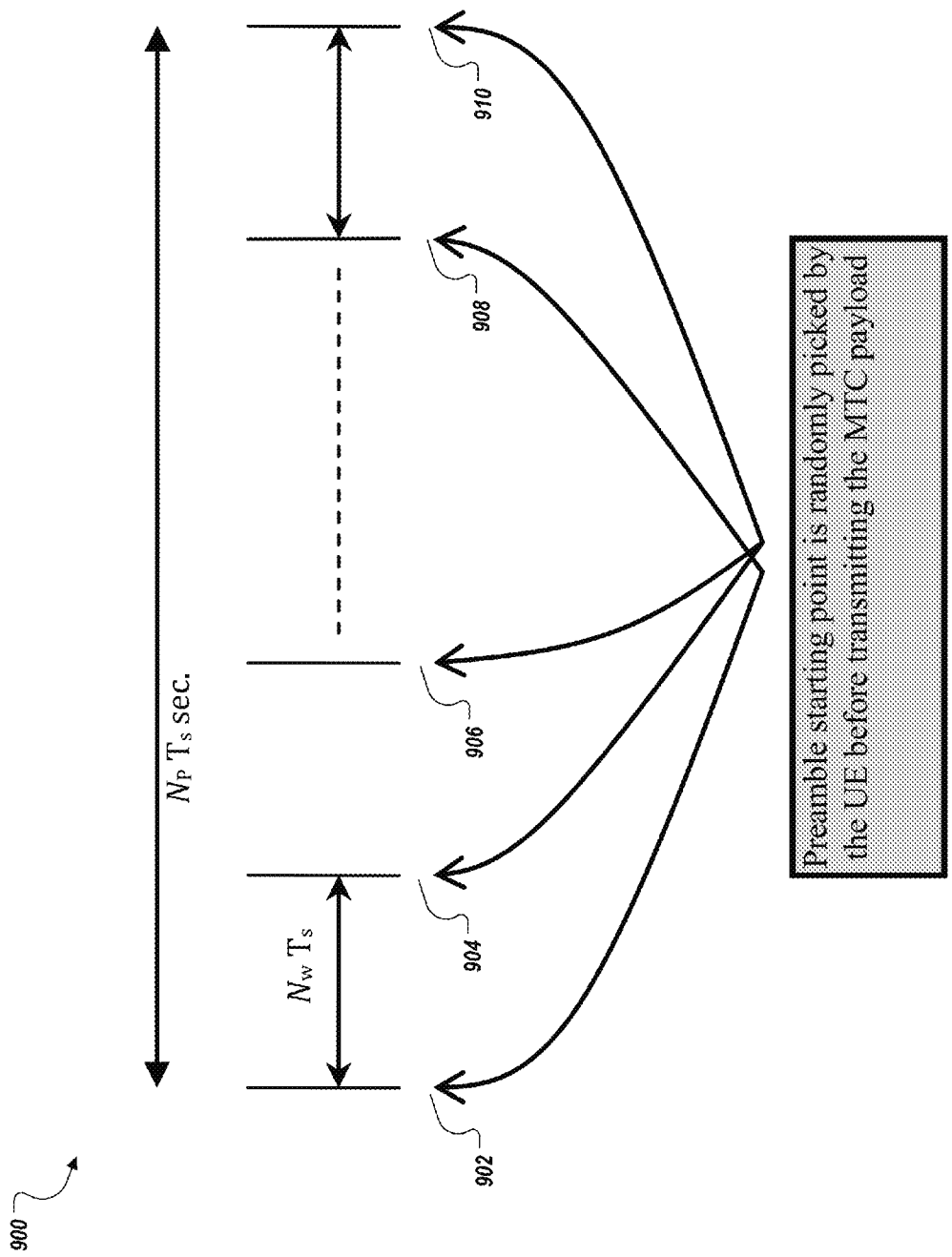
FIG. 9 is a schematic illustrating an example of a random placement of a preamble sequence within a PUS SCH burst.

FIG. 9 is a schematic 900 illustrating random placement of a preamble sequence in a PUSSCH burst. In some implementations, the preamble sequence may be picked from a set of sequences with good auto-correlation and cross correlation properties (in the time and/or frequency domain). Once selected, the UE may randomly select the placement of the preamble sequence within the PUSSCH burst. As illustrated, the schematic 900 illustrates the UE randomly selected at positions 902, 904, 906, 908, and 910. In some implementations, the transmission window of $N_p T_s$ can be subdivided into $M_w$ sub-windows of size $N_w T_s$, where $T_s$ represents the symbol duration ($N_p = M_w N_w$). A network node (e.g., eNB) may set the $N_w$ based on the expected delay spread experienced by the communication link. For example, $N_w$ may be set as $\eta\tau_{max}$, where $\tau_{max}$ may be the maximum delay spread plus the expected maximum propagation delay from a UE (depending on the coverage area) and $\eta$ may be a positive scaling factor greater than 1.

Figure 10:
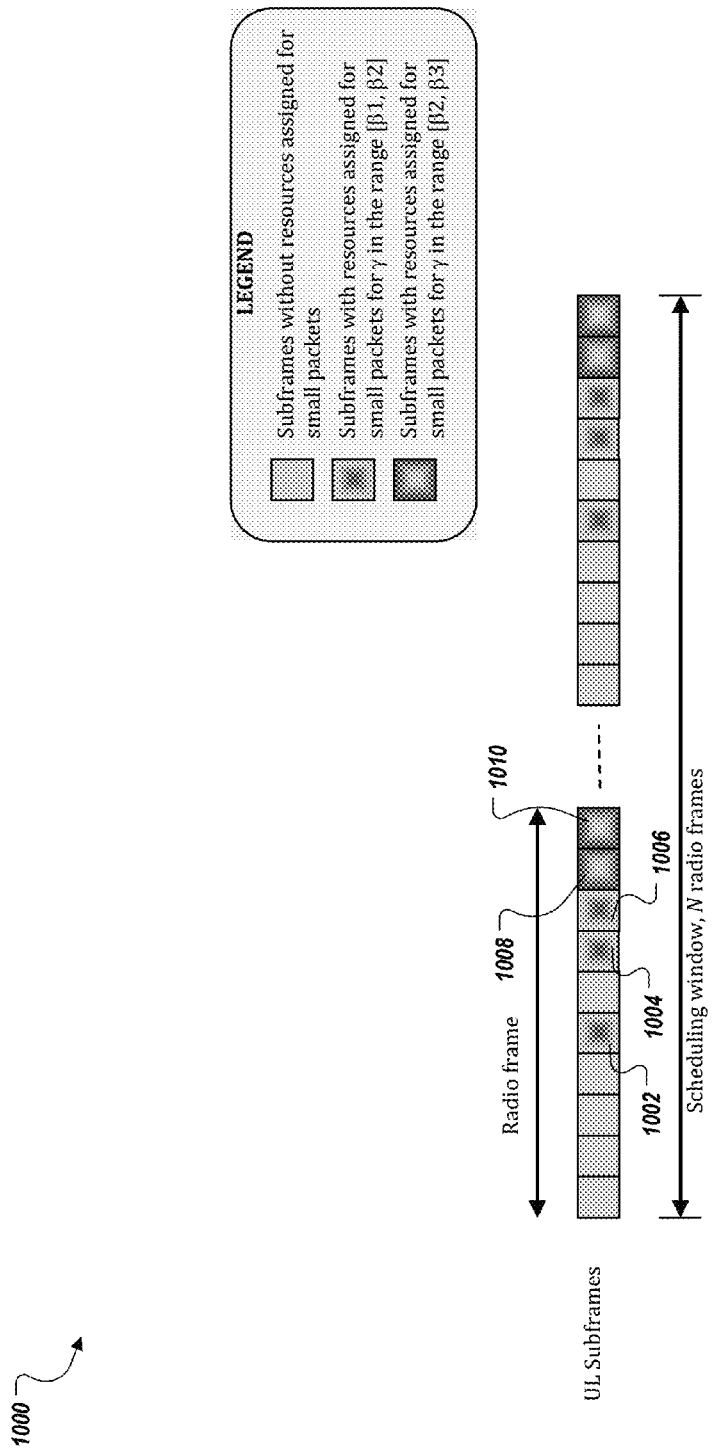
FIG. 10 is a schematic illustrating an example of subframe assignment for simultaneous access by UEs for packet transmission.

FIG. 10 is a schematic 1000 illustrating subframe assignment for simultaneous access by UEs for packet transmission. In some implementations, a specific number of radio blocks (RBs) every few uplink (UL) subframe within a radio frame may be dedicated to PUSSCH. This resource assignment may be periodically modified according to the traffic within each cell. Also, the PUSSCH subframes are not assigned to any specific UE but are available for contention based simultaneous access by the registered UEs. Alternately, PUSSCH subframes may be allocated to sets of devices with varying periodicity. For example, the sets of PUSSCH subframes may be allocated based on an indicator of signal quality or a type of receiver used by the network node.

When based on a signal-quality indicator, the packet transmission opportunities for each UE are decided, for example, by the following rule: UE i transmits its packet on the subframe-$v_i$ where $v_i=f(\gamma_i)$. $\gamma_i$ is the DL signal to noise plus interference ratio (SINR) (or in general any indicator of signal quality) estimated by UE-i, and $f(\gamma)$ is the set of subframe numbers over which UE-i transmits packets. For example, the UEs at the coverage edge of the serving cell may be given more opportunities compared to a UE in the cell center. As illustrated in schematic 1000, subframes 1002, 1004 and 1006 of the first radio frame are assigned for UEs which experience a DL SINR of $\beta1 \leq \gamma \leq \beta2$ and subframes 1008 and 1010 are assigned for UEs which experience a DL SINR of $\beta2 \leq \gamma \leq \beta3$ and so on. By segregating the UEs based on some parameter such as signal quality, the probability of packet collision can be reduced. The described subframe segregation can be optimized or otherwise enhanced based on the type of receiver employed to decode UE transmissions at the network Node (e.g., eNB). For example, segregating the subframes such that the received powers from the UE transmissions are close (e.g., within 5 dB) to a predefined threshold is suitable to a joint multi-user (MU) detector. For a successive MU detector, the received powers from UEs should differ to optimize or otherwise enhance performance.

When allocation of PUSSCH subframe sets is based on a receiver type of a network node, UEs in different directions may be assigned the same resource to enable the MU-MUD algorithm to separate the UE transmissions. For SIC processing, the UEs may be allocated PUS SCH subframe sets based on UEs with different receive powers (but within a reasonable receive dynamic range). For example, UEs within a first receive power range may be allocated a first set of subframes while UEs in a different receive power range may be allocated a different set of subframes. Other criteria may be used to allocate different subframes sets such as speed, location, application type or others. In addition, a UE typically does not need all RRUs in the PUS SCH, so the impact of collision may be eliminated, minimized, or otherwise reduced by the UE randomly selecting the RRU to transmit on.

FIGS. 11-18 illustrate various implementations for resource assignment for simultaneous assignment. For example, resource assignment for simultaneous assignment may include one or more of the following: simultaneous access with preamble allocation by the network node (e.g., eNB); simultaneous access with preamble contention; simultaneous access with preamble contention and reservation; and simultaneous access with different preamble selection options (a combination of the previous three schemes). In regard to simultaneous access with preamble allocation by the network node, RRUs from the configured RRU-sets may be pre-assigned for UEs by assigning the preamble for each UE. The preamble may be obtained when the UE enters a new serving cell area and wants to transmit data. Multiple UEs can transmit data on the same RRU using different preambles. When a UE does not transmit any data over the RRU continuously, the serving cell may re-assigned the preamble to another UE. The condition for re-assigning the RRU may be a broadcast parameter set by the network node (e.g., eNB). In some instances, the network node (e.g., eNB) may publish a status report for retransmission purposes. Though, when the UE infrequently transmits data packets, radio resources may be wasted.

In some implementations, resource assignment for simultaneous assignment includes simultaneous access with preamble contention. In this contention scheme, the network-registered UEs which intend to send data packets may randomly select a RRU and an associated unused preamble and transmit, to the serving cell, user data on the selected RRU using the selected preamble. The serving cell may attempt to decode the transmitted data packet and broadcast the result of the detection over the DL.

Figure 11:
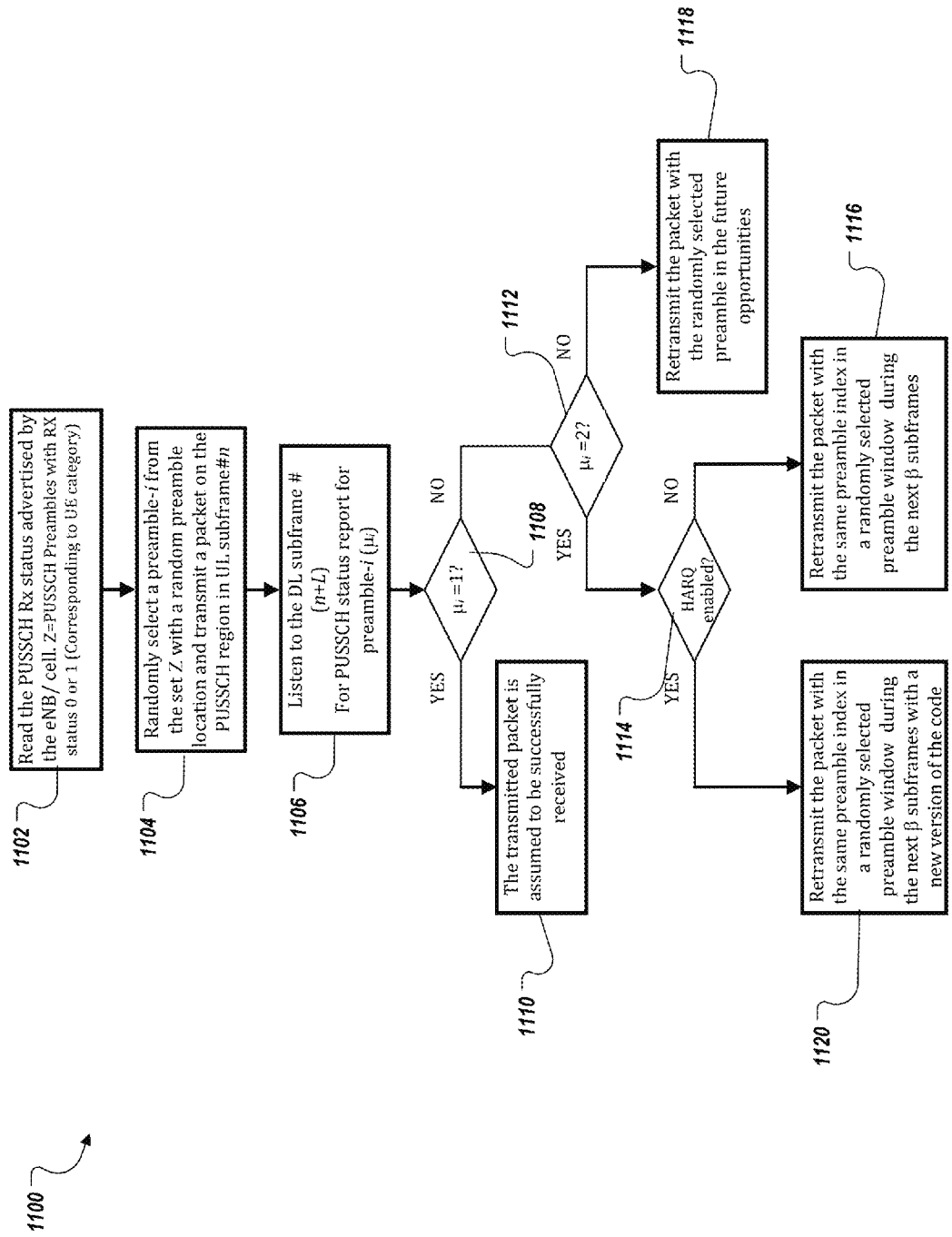
FIG. 11 is a flowchart illustrating an example of UE functionality relative to preamble selection and transmission.
Figure 12:
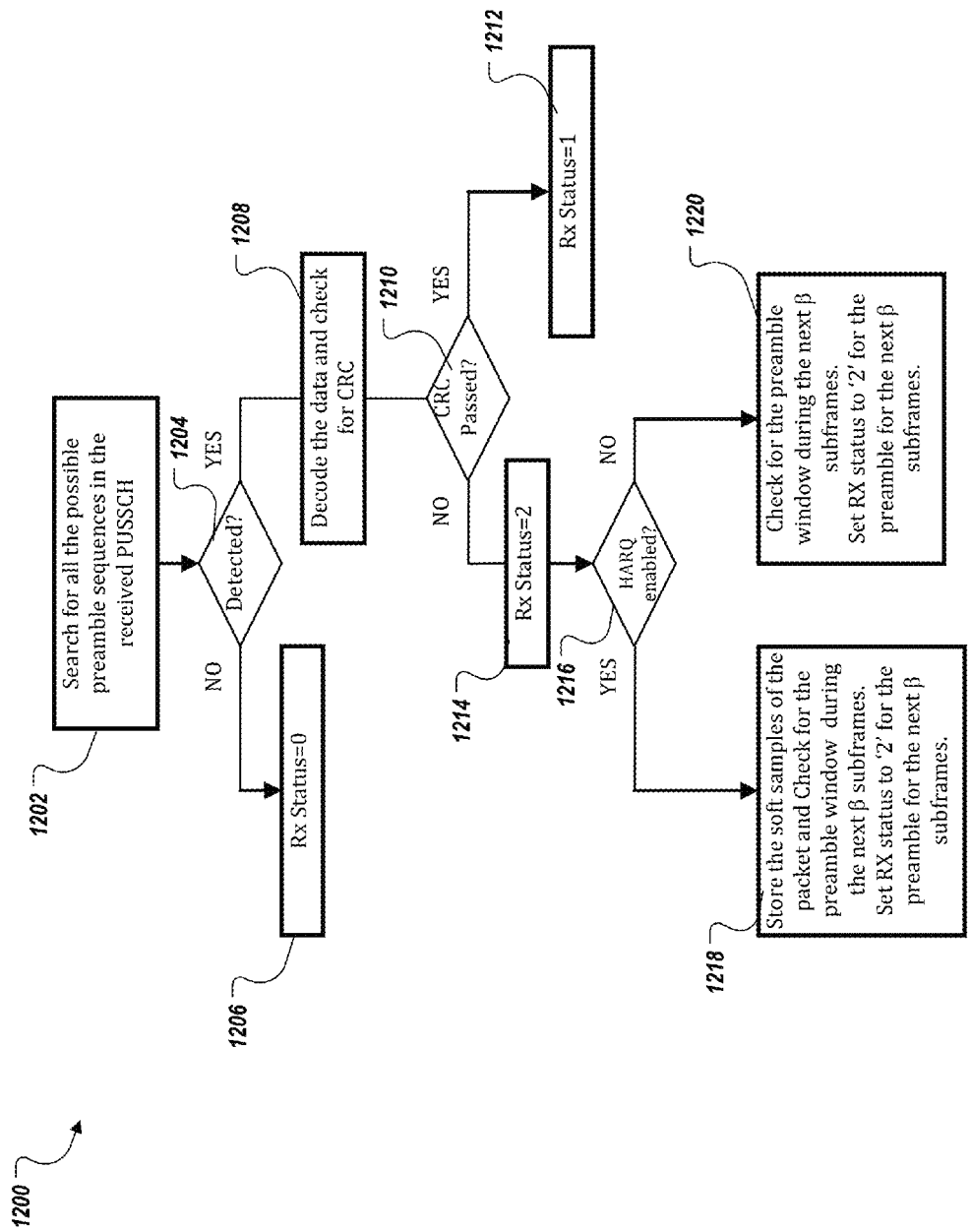
FIG. 12 is a flowchart illustrating an example of eNB functionality relative to preamble selection and transmission.

FIGS. 11 and 12 are flowcharts 1100 and 1200 illustrating the UE and network node (e.g., eNB) processes when executing the contention scheme. In FIG. 11, the flowchart 1100 begins at step 1102 where the UE reads the PUS SCH receive status advertised by the cell and obtains a set Z identifying the PUSSCH preambles and, for each preamble, a status as to whether that preamble is available. In some implementations, the network node may broadcast parameters (e.g., $\beta$), allowed preambles, and discrete positions for the preamble within the data packet. In addition, the network node may also indicate whether HARQ is enabled on PUSSCH or not. At 1104, the UE randomly selects both a preamble sequence from the set Z and a preamble location, appends the preamble in a randomly selected position within the user data, and transmits the user packet in the PUSSCH. Next, at step 1106, the UE monitors the DL subframes for a status report of the transmission. In some implementations, the UE may monitor a DL subframe with a predefined offset from the PUS SCH UL subframe where the user packet was transmitted. In some instances, the receive status may be indicated as followed: '0' represents the preamble is not detected; '1' represents that the data associated with the detected preamble is successfully decoded; and '2' indicates that the data associated with the detected preamble is not successfully decoded. If the receive status μ is '1' at decisional step 1108, then, at step 1110, the UE determines that the network node (e.g., eNB) successfully received the transmitted packet. If the receive status μ is not '1', execution proceeds to decisional step 1112. If the receive status μ is '2', then execution proceeds to decisional step 1114. If the hybrid automatic repeat request (HARQ) is enabled, then, at step 1116, the UE retransmits the user packet with the same preamble but at a different location in a randomly selected RRU in the next β subframes. The selection of β may maximize or otherwise increase system capacity and reduce packet collisions. Returning to decisional step 1112, if the status report μ is not equal to '2', then at step 1118, the UE retransmit the user packet with a randomly selected preamble in future opportunities. Returning to decisional step 1114, if the HARQ is disabled, then, at step 1120, the packet is retransmitted with the same preamble index in a randomly selected preamble window during the next β subframes with a new version of a modulation and coding scheme (MCS) code.

In FIG. 12, the flowchart 1200 starts at step 1202 where the network node (e.g., eNB) searches the received PUSSCH for preamble sequences used during the transmissions. For each preamble, if that preamble was detected at decisional step 1204, then, at step 1206, reception status is set to '0'. If that preamble was detected, then, at step 1208, the data is decoded and checked for CRC. If the CRC passes at decisional step 1210, then, at step 1212, the receive status is set to '1'. If CRC does not pass, then, at step 1214, the receive status is set to '2'. The CRC may not pass for various reasons such as the receive signal quality may not be sufficient or more than one UE transmitting data packets using the same preamble on the same RRU, i.e., a collision. If the HARQ is enabled at decisional step at 1216, then, at step 1218, the network node (e.g., eNB) stores soft samples of the packet and checks for the preamble window during the next β subframes. If the HARQ is disabled, then, at step 1220, network node checks for the preamble window during the next β subframes and sets the receive status to '2' for the next β subframes.

Figure 13:
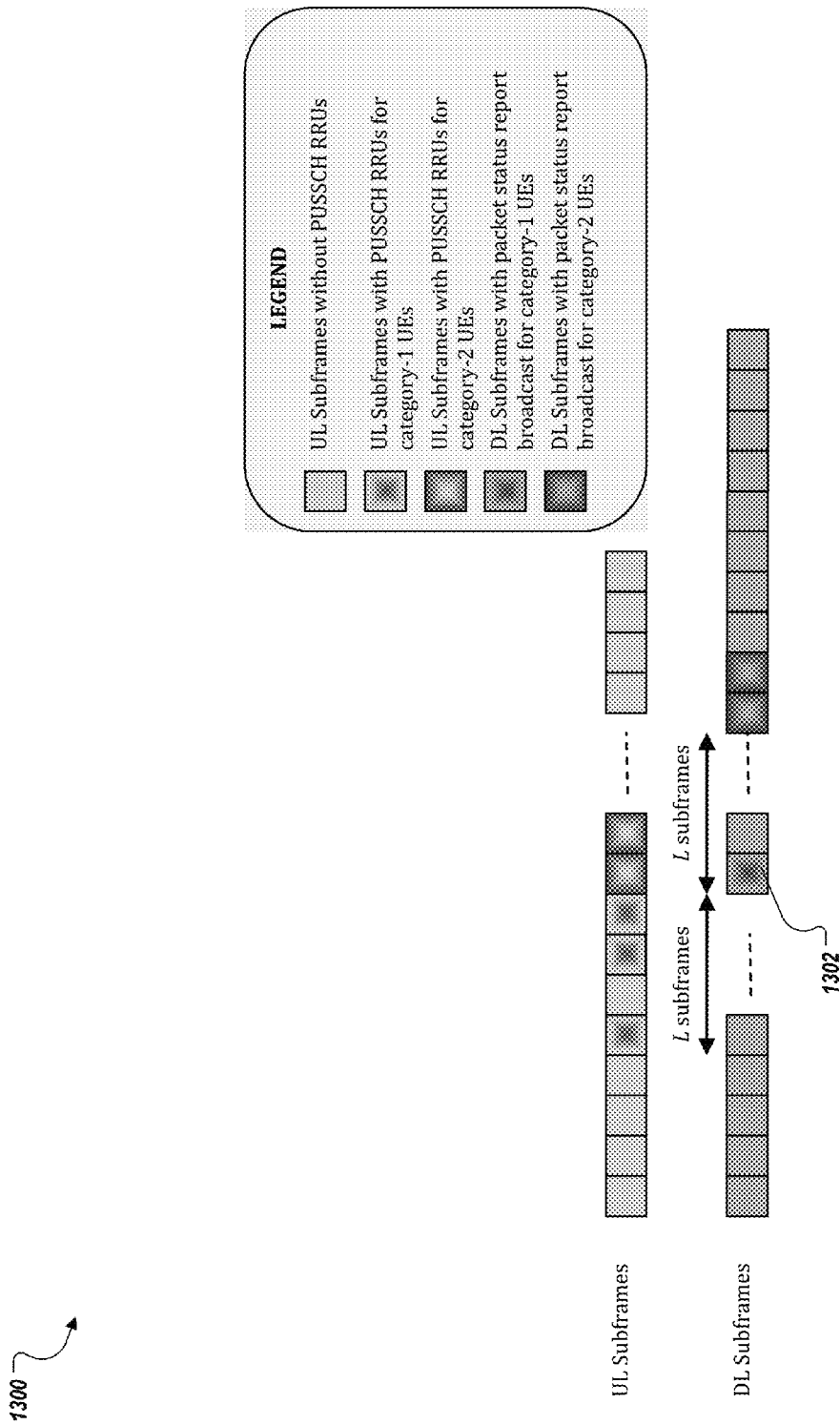
FIG. 13 is a schematic illustrating an example of a data format in a preamble contention based PUS SCH.

FIG. 13 is a schematic 1300 illustrating preamble contention based PUSSCH. As illustrated, the schematic 1300 includes the packet status report 1302 which is broadcast after L subframes. If the status report 1302 indicates a previously-transmitted packet was not received, then the UE may randomly select both another PUSSCH RRU allocation and a corresponding preamble and retransmit the data packet using the selected RRU and preamble. The retransmitted packet may also include a NDI bit 0 or 1 to indicate an original transmission or a retransmission, respectively. In some implementations, a UE may not retransmit a data packet within L subsequent subframes. If there are M preambles configured, N UEs may be able to simultaneously transmit the data packets in a given PUSSCH RRU, where M≥N.

Figure 14:
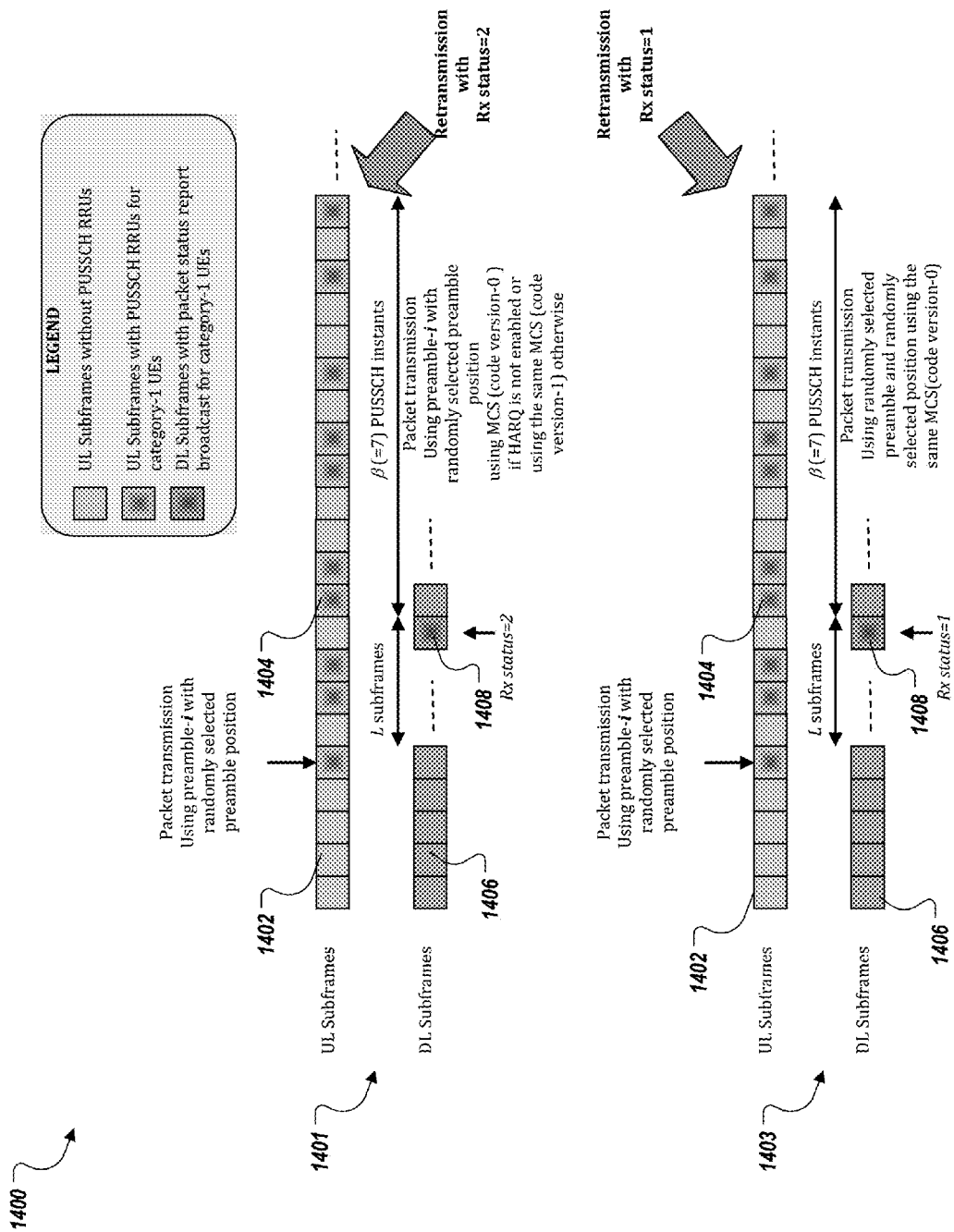
FIG. 14 is a schematic illustrating examples of various retransmission scenarios.

FIG. 14 is a schematic 1400 illustrating different retransmission scenarios. Scenario 1401 illustrates a retransmission scenario when the receive status is '2'. As illustrated, the scenario 1401 includes UL subframes without PUSSCH RRUs 1402 and with PUSSCH RRUs 1404, and DL subframes without packet status reports 1406 and with packet status reports 1408. In the illustrated implementation, the packet transmission occurs using an assigned preamble with a randomly selected position using MCS if HARQ is not enabled or using the same MCS otherwise. Scenario 1403 illustrates a retransmission scenario when Rx status is '1'. In the illustrated implementation, the scenario 1401 includes UL subframes without PUSSCH RRUs 1402 and with PUSSCH RRUs 1404, and DL subframes without packet status reports 1406 and with packet status reports 1408. Though, the packet transmission occurs using a randomly selected preamble with a randomly selected position using the same MCS.

A detailed procedure for executing some implementations of simultaneous access with preamble contention with respect to an LTE system is provided in paragraphs 0063-65. In some implementations, the UE may register with the LTE network by selecting an appropriate eNB in its vicinity. During this procedure, the UE may read the system information broadcast by the eNB. The cell selection may also depend on the capability of the eNB indicated in the system broadcast information advertised by the eNB. During the registration, the UE may have to reselect a different cell/eNB either autonomously or as directed by the LTE EPC. This reselection may depend on the eNB capabilities. The reselection can be a handover (HO) or network entry.

When the UE intends to transmit a packet on the UL, UE may randomly select both an appropriate PUSSCH RRU and an associated preamble and transmit the data packet. The UE may determine the transmit power of the UL packet based on the path loss measured on the DL and the expected received power at the eNB. A target receive power level at the eNB is broadcasted by the eNB. One PUSSCH RRU may be randomly selected from a list of the available PUSSCH RRUs within a window of duration W. The duration of W may be based on the number of PUSSCH RRUs within each subframe. In addition to selecting a PUSSCH RRU, the UE may monitor the DL channel for a PUSSCH status report which indicates the preamble usage for a previously received PUSSCH. The UE may randomly pick a preamble from the list of preambles which may be indicated as available using, for example, the tags '0' or '1.' If the total number of preambles which are tagged as '2' are equal to N, the maximum number of simultaneous UE transmissions allowed on a RRU, the UE may not transmit any UL transmission at the next instant of that RRU set. The UE may then randomly select a new PUSSCH RRU and a new preamble.

After L subframes subsequent to the transmission of a data packet on the UL, DL subframe# (n+L) may be monitored for the status report of PUSSCH which indicates the reception status of the PUSSCH received in the subframe# n. When there are multiple RRUs dedicated to UEs in subframe# n, then there may be one PUSSCH status report for each RRU. Note that this procedure is preamble-RRU specific (not UE specific).

If the PUSSCH status report does not indicate that the transmission in the subframe# n is successful, the UE may retransmit the packet during a next available instant. The UE may retransmit the packet with the same preamble but at a different location in a randomly selected PUSSCH subframe in the next β instants. The selection of β is important to maximize or otherwise increase system capacity and reduce packet collisions. A UE retransmitting the packet may wait at least L subframes before repeating the illustrated in FIG. 11. The transmit power level may be increased after repeated failures. If a data packet is received at the eNB with better than expected signal quality, the eNB may indicate to the UE in the receive status report that the transmit power may be reduced.

Figure 15:
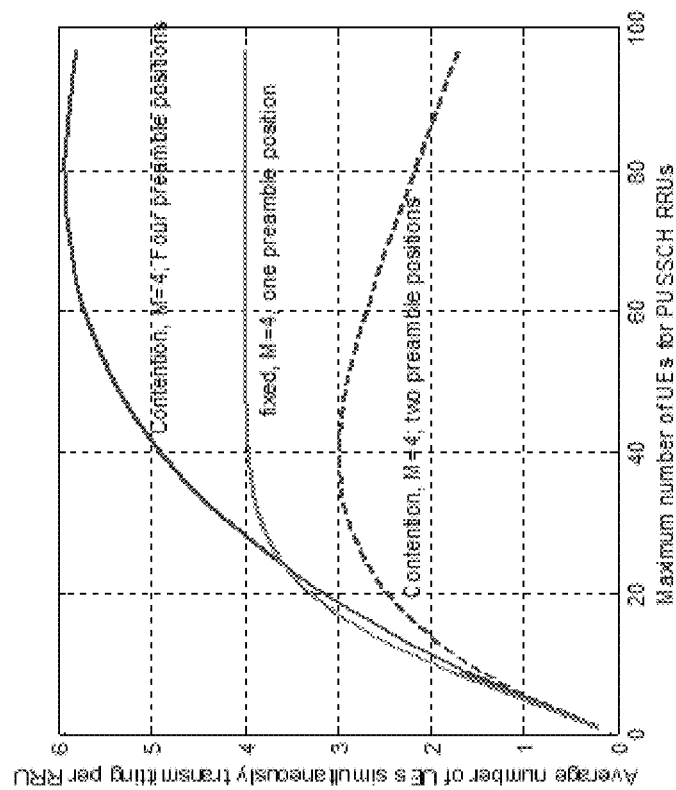
FIG. 15 is a graph illustrating an example distribution of preamble allocation versus contention.

FIG. 15 is a graph 1500 illustrating a comparison of preamble allocations to preamble contention. In particular, the graph 1500 plots the average number of UEs simultaneously transmitting per RRU versus a maximum number of UEs for PUSSCH RRUs. The preamble allocation procedure requires additional control signaling while the preamble contention does not require signaling. Preamble allocation may be useful for UEs that are transmitting regularly on the assigned resources while preamble contention is useful for UEs that are sending reports to the network sporadically.

Figure 16:
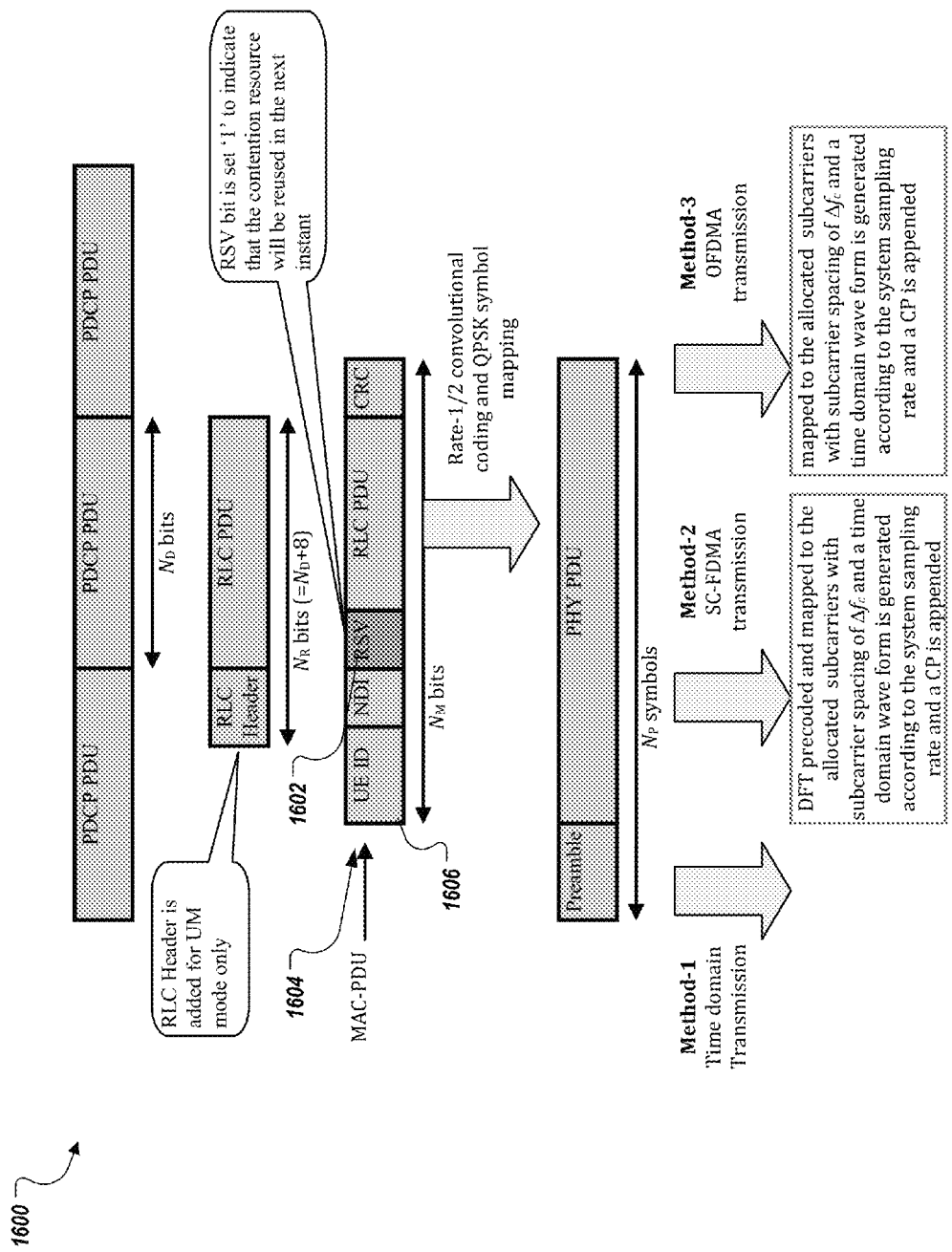
FIG. 16 is a schematic illustrating an example of a PUSSCH payload transmission format utilizing a Reserved (RSV) bit indicating that the contention resource will be reused.
Figure 17:
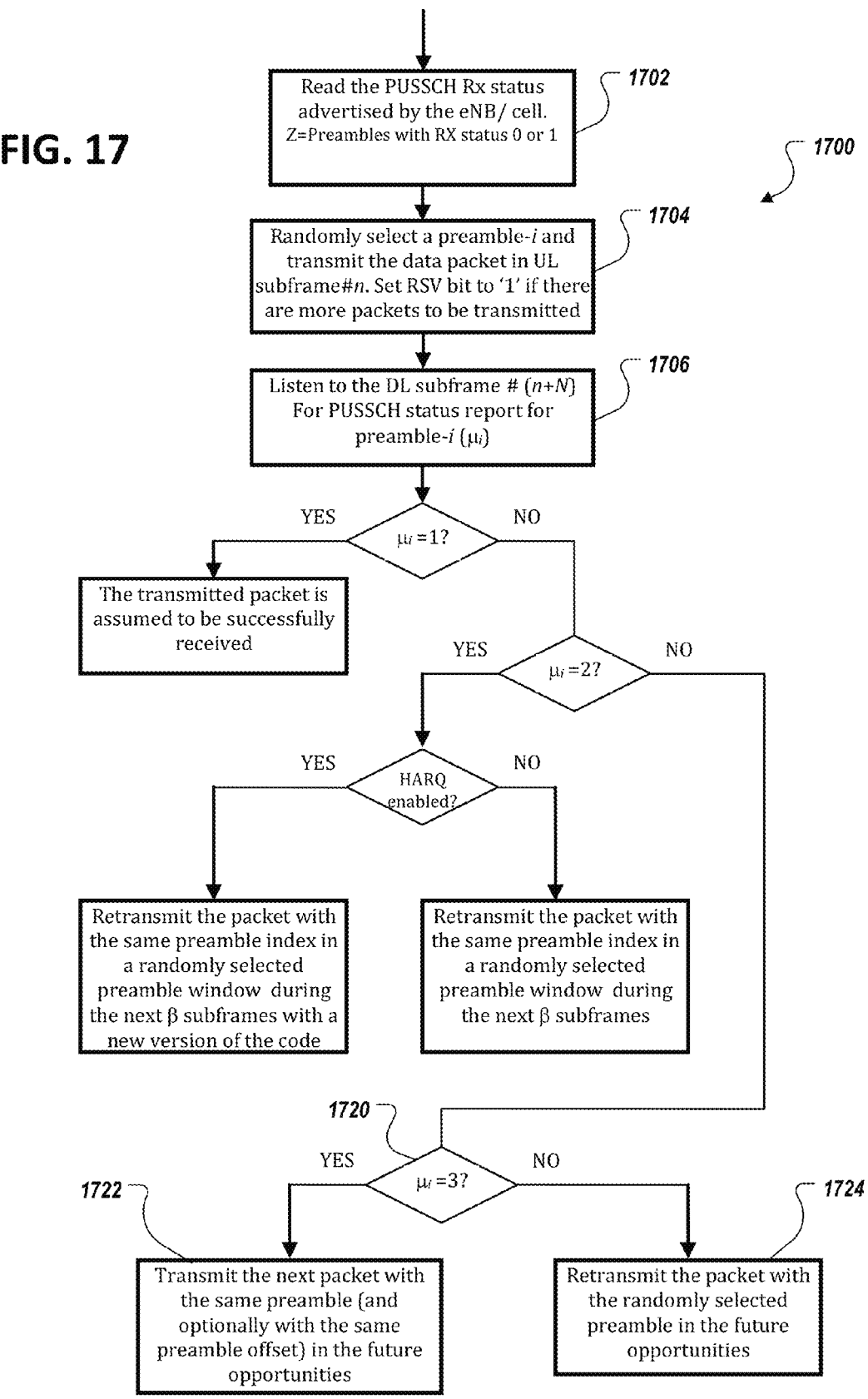
FIG. 17 is a flowchart illustrating an example of UE functionality relative to preamble reservation.
Figure 18:
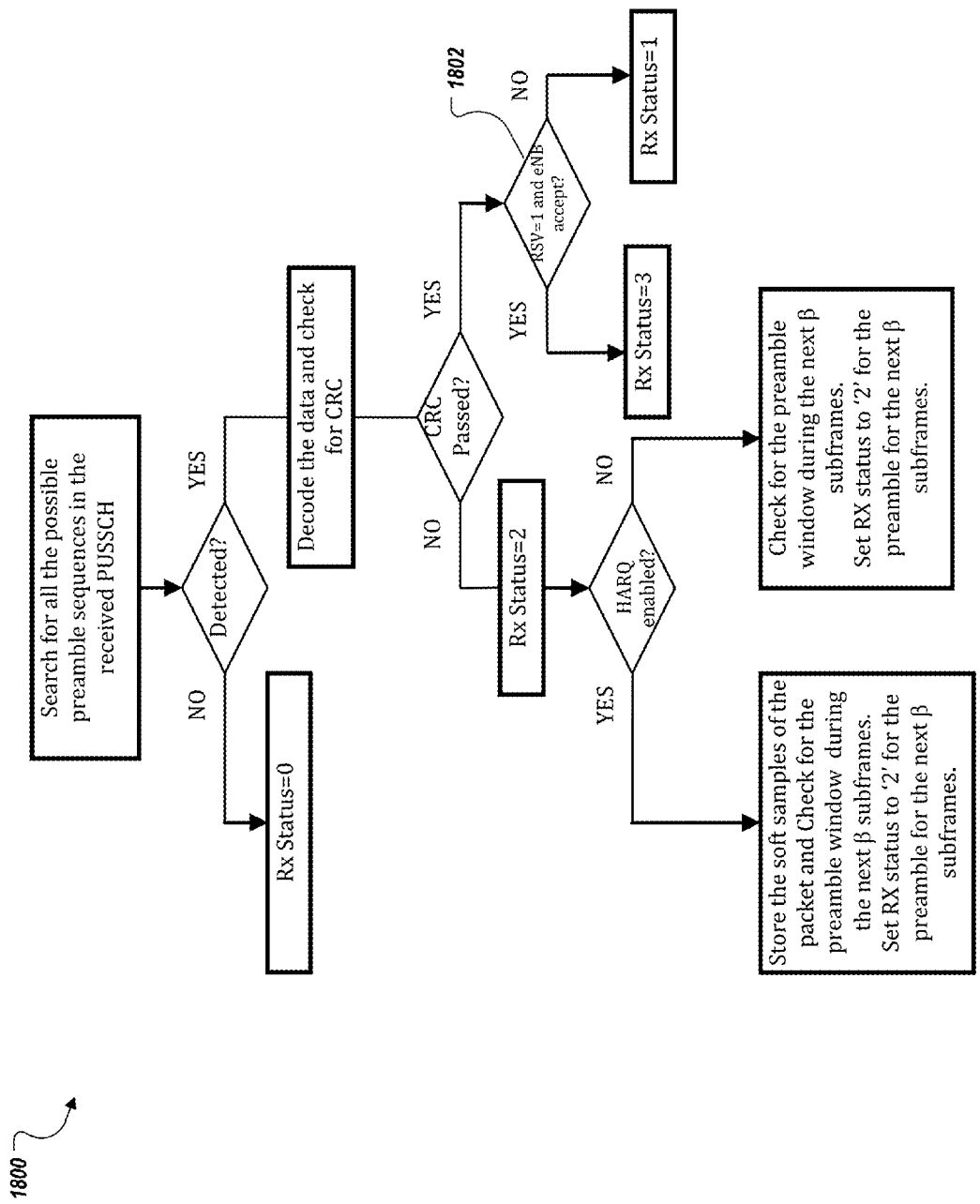
FIG. 18 is a flowchart illustrating an example of eNB functionality relative to preamble reservation.

FIGS. 16-18 illustrate simultaneous access with preamble contention and reservation. In the previous contention mechanism, when the number of UEs contending for the resources increase, the number of collisions may negatively affect system capacity. Furthermore, in simultaneous access with preamble contention, since the preamble selection is based on the previous PUSSCH reception status report, there is a chance of collision or waste of resources if the same UE doesn't transmit during the next RRU. Alternatively, the UEs may transmit an indication of an intention to reuse that contention resource in the next instant. In these instances, the contention resource consists of data with a unique preamble sequence. The serving cell may transmit, using a DL channel, the resource claim confirmation. Once the UE finishes using the resource, the UE may transmit an indicator in the last transmitted packet disowning the resource. In some implementations, the UE can indicate a claim of a resource either by appending a bit to the MAC header of the currently transmitted packet or alternatively send a UE specific sequence (without appending data) over the RRU.

A detailed procedure for executing some implementations of simultaneous access with preamble contention and reservation in an LTE system is described in paragraphs 0069-071. Initially, the UE registers with the LTE network by selecting an appropriate eNB in its vicinity. During this procedure, UE reads the system information broadcast by the eNB. The cell selection may also depend on the capability of the eNB indicated in the system broadcast information advertised by the eNB. During the registration, the UE may have to reselect a different cell/eNB either autonomously or if directed by the LTE EPC. This reselection may depend on the eNB capabilities. The reselection can be a handover (HO) or network entry.

When the UE intends to upload data to a network server using PUSSCH, the UE may randomly select an appropriate PUSSCH RRU, an associated random preamble, and a random preamble allocation. The transmit power of the UL packet is determined based on the path loss measured on the DL and the expected received power at the eNB. The target receive power level at the eNB is broadcasted by the eNB. In some instances, one PUSSCH RRU is randomly selected from a list of the available PUSSCH RRUs within a window of duration W. The duration of W may be determined based on the number of PUSSCH RRUs within each subframe. The UE may monitor the DL channel for a PUSSCH status report which indicates the preamble usage for a previously received PUSSCH. The UE may randomly select a preamble from the list of preambles which is indicated as available such as by tagging them '0' or '1.' If the total number of preambles which are tagged as '2' are already equal to N, the maximum number of simultaneous UE transmissions allowed on a RRU, the UE may not transmit any UL transmission at the next instant of that RRU set. The UE may then randomly select a new PUSSCH RRU and a new preamble.

The UE may indicate, to the serving cell, an intention to reuse a contention resource by appending a bit in a MAC header to the current UL packet as illustrated in FIG. 16. In particular, the schematic 1600 illustrates a PUSSCH payload transmission format with a reserve (RSV) bit. As illustrated, the MAC PDU includes an RSV bit 1602 in the MAC header 1606 to indicate the contention resource reservation. Alternatively, the UE may also reserve the contention resource by sending a UE specific ID sequence during a PDSSCH RRU. If the contention resource corresponding to preamble #m is selected, the UE specific sequence is transmitted during the RRU-p, where mod (p, M)=m. The serving eNB may detect the transmitted UE specific ID sequence by correlation detection.

FIG. 17 is a flowchart 1700 illustrating an example method 1700 for a UE executing preamble reservation. The flowchart 1700 begins at 1702 where the UE reads the PUSSCH receive status for the preambles that eNB advertised. At step 1704, the UE randomly selects a preamble and transmits, using the selected preamble, a user packet in the UL subframe #n. After L subframes or subframe #(n+L), the UE monitors, at step 1706, the DL for the status report, which indicates the reception status of the transmissions received in the subframe #n of the PUSSCH. When multiple RRUs are dedicated to UEs in subframe #n, one PUSSCH status report for each RRU is transmitted. This procedure may be preamble-RRU specific (not UE specific). If the receive status μ is '1' at decisional step 1708, then, at step 1710, the UE determines that the network node (e.g., eNB) successfully received the transmitted packet. If the receive status μ is not '1', execution proceeds to decisional step 1712. If the receive status μ is '2', then execution proceeds to decisional step 1714. If the hybrid automatic repeat request (HARQ) is enabled, then, at step 1716, the UE retransmits the user packet with the same preamble but at a different location in a randomly selected RRU in the next β subframes. The selection of β may maximize or otherwise increase system capacity and reduce packet collisions. Returning to decisional step 1712, if the status report μ is not equal to '2', then execution proceeds to decisional step 1718. If the receive status for the preamble index is '3', then, at step 1722, the UE determines that the transmitted packet has been successfully received and transmits the next packet with the same preamble (and optionally preamble offset) in future opportunities. In some implementations, the UE may also include a reservation of a contention resource in the next PUSSCH instant. During the next contention window, the UE may transmit a new packet using the same preamble index but with a randomly selected preamble position. If the receive status is not '3', then, at step 1724, the UE retransmits the user packet with the randomly selected preamble in future opportunities. In some instances, the UE may retransmit the packet with the same preamble but at a different location in a randomly selected PUSSCH subframe in the next β instants. As previously mentioned, the selection of β may maximize or otherwise increase system capacity and reduce packet collisions. Returning to decisional step 1114, if the HARQ is disabled, then, at step 1720, the packet is retransmitted with the same preamble index in a randomly selected preamble window during the next β subframes with a new version of a modulation and coding scheme (MCS) code. A UE retransmitting the packet may wait at least L subframes before repeating the above steps FIG. 17. In some instances, the transmit power level may be increased after repeated failure.

FIG. 18 is a flowchart 1800 illustrating an example for eNB executing preamble reservation. The flowchart 1800 starts at step 1802 where the network node (e.g., eNB) searches the received PUSSCH for preamble sequences used during the transmissions. For each preamble, if that preamble was detected at decisional step 1804, then, at step 1806, reception status is set to '0'. If that preamble was detected, then, at step 1808, the data is decoded and checked for CRC. If the CRC passes at decisional step 1810, then execution proceeds to decisional step 1812. If CRC does not pass, then, at step 1814, the receive status is set to '2'. The CRC may not pass for various reasons such as the receive signal quality may not be sufficient or more than one UE transmitting data packets using the same preamble on the same RRU, i.e., a collision. If the HARQ is enabled at decisional step at 1816, then, at step 1818, the network node (e.g., eNB) stores soft samples of the packet and checks for the preamble window during the next β subframes. If the HARQ is disabled, then, at step 1820, network node checks for the preamble window during the next β subframes and sets the receive status to '2' for the next β subframes. Returning to decisional step 1812, if the contention resource is reserved and accepted, then, at step 1822, the receive status is set to '3'. If the contention resource is not reserved or not accepted, then, at step 1824, the eNB sets the receive status to '1'. If a data packet is received at the eNB above a signal quality threshold, the eNB may indicate to the UE in the RX status report that the transmit power may be reduced.

FIGS. 19-24 illustrate PUSSCH transmission and reception schemes. In particular, a number of transmission and reception schemes are possible for PUSSCH and may include one or more of the following: timing advance and cyclic prefix; PUSSCH transmission in time domain; PUSSCH with narrowband SC-FDMA transceiver; and PUSSCH receiver processing. As discussed in more detail below, both time domain and frequency domain based transceivers for PUSSCH are described as well as narrowband operation of PUSSCH.

In regard to timing advance and cyclic prefix, an appropriate cyclic prefix may be added to SC-FDMA symbols to address the timing drift of UL transmissions from different UEs. For a stationary UE, the UE may receive, from the wireless network, a UL transmission timing advance value during registration. When stationary, the timing advance typically remains substantially constant. Prior to PUSSCH transmission, the UE may synchronize to DL, such that the UL is also synchronized with the system in both frequency and time. The LTE normal CP length (about 5 μs) configuration may be adequate to handle the timing uncertainty depending on the expected channel delay spread.

For non-stationary UE, the timing advance for UL transmissions may change over time. The timing may drift out of the CP window if the normal CP length configuration is used. Instead of using a normal CP, an extended CP length configuration may be used for non-stationary UEs. The extended CP lasts about 17 μs and covers about a 5 km radio propagation distance (assuming that the channel delay spread is small). This coverage may be within one cell coverage area in normal deployment scenarios, so the timing drift may not be an issue if an extended CP is used. In some implementations, an additional guard period may be added to the end of PUSSCH transmission. For Doppler frequency shift, the current LTE system may be able to tolerate Doppler frequency caused by up to 120 km/h moving speed with 2 GHz carrier frequency for low data rate transmission. In these instances, UL frequency synchronization may not be an issue either if the extended CP configuration is used. In some implementations, some of the subframes for the PUSSCH may be configured with an extended CP. In these instances, the UEs that are classified as "highly mobile" may be placed in that subframe.

In the case of non-stationary UEs, where SC-OFDM symbols with an extended CP are implemented, the LTE UL subframes may be configured with extended CP subframes. To maximize or otherwise increase the spectral efficiency, some of the UL subframes may be configured with OFDM symbols with extended CP. The eNB may not grant resources for stationary UEs in these subframes. Similarly, the PUCCH, PRACH and SRS assignments may also be avoided during these subframes. During these subframes with extended CP, only non-stationary UEs may be scheduled. Alternatively, only one or several sub-bands in the UL band in some subframes may be assigned for PUSSCH transmission by non-stationary UEs. In these instances, only these sub-bands for PUSSCH transmission are configured to use extended CP, the rest of band for other LTE UL channel transmission may still use normal CP configuration. However, as normal CP and extended CP are mixed in one subframe, the subcarriers with different CP configuration may lose orthogonality and inter-carrier interference may occur. Inserting a guard band between a normal CP and an extended-CP subband may reduce the inter-carrier interference to an acceptable level.

Figure 19:
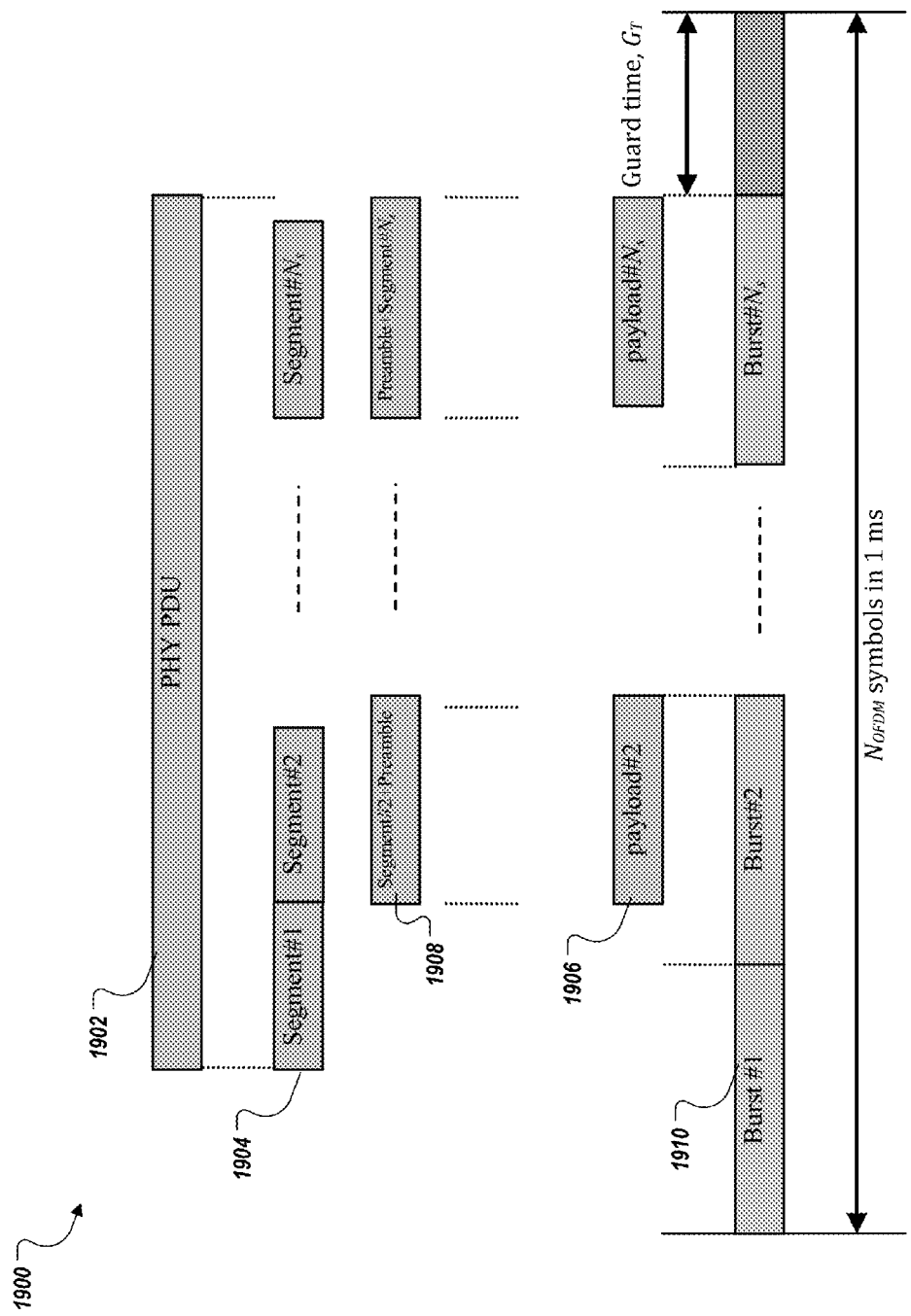
FIG. 19 is a schematic illustrating an example of a PHY PDU mapping on to a time domain burst.
Figure 20:
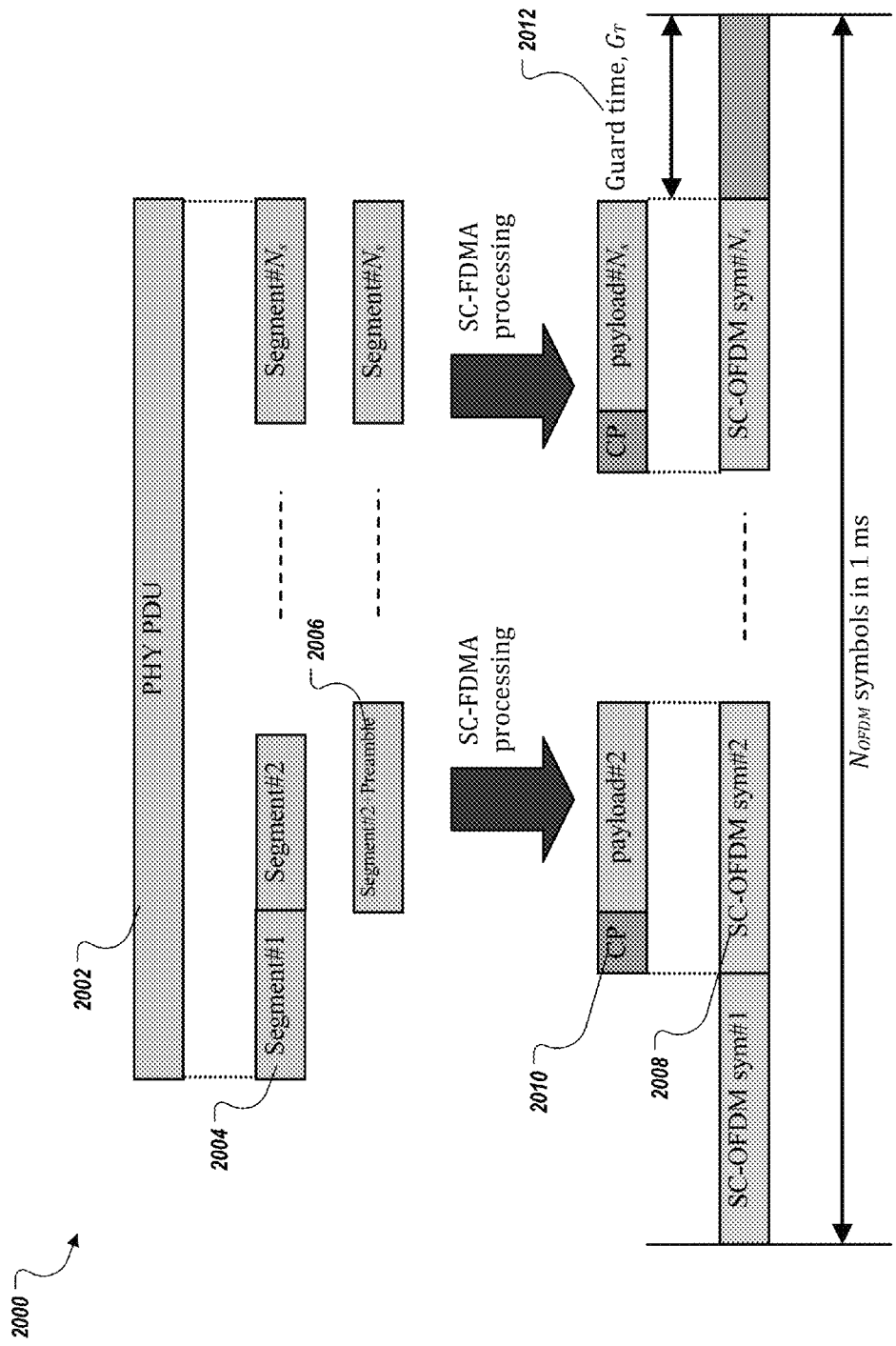
FIG. 20 is a schematic illustrating an example of a PHY PDU mapping on to SC-OFDM symbols.

FIG. 19 is a schematic 1900 illustrating a procedure for PHY PDU mapping on to time domain burst. As illustrated, the schematic 1900 includes a physical layer payload 1902 segmented into multiple small packets 1904 and mapped on to small payloads 1906 with a short preamble 1908 appended to each segment. The number of bursts 1910 within a subframe duration depends on the deployment scenario. For example, if the UEs are fast moving (e.g., above example speed?), then having multiple packets with the preamble bits spread across the time duration may provide better channel tracking. If the UEs are stationary, a small number of bursts (e.g., example range?) are configured with one or two preambles across the subframe. The various design parameters and the design criteria are listed in Table 1 below:

TABLE 1

| Design Parameters and Criteria for PUSSCH in time domain | |
| --- | --- |
| Parameters | |
| Signal bandwidth of RRU (including the Guard band) | 180 kHZ |
| Number of bursts in 1 ms | $N_s$ |
| Guard time | $G_T$ |
| Time duration of PHY payload segment | T |
| Design criteria: | |
| $N_s T + G_T = 1$ ms<br>payload in one RRU = $180/(1 + \beta)$<br>$G_T > \tau_D$<br>Length of the preamble $> 2 * \lceil \tau_D/T_s \rceil - 1$<br>$\tau_m$ and $\tau_D$ are the maximum channel delay dispersion and the maximum time offset expected from the UE transmission<br>$T_s$ is the symbol duration<br>$\beta$ is the excess bandwidth | |

For example, for an excess bandwidth of 50%, the number of payload bits is 120 symbols out of which 24 symbols are dedicated to the preamble.

FIGS. 20-23 illustrate PUSSCH using a narrowband SC-FDMA transceiver. In regard to FIG. 20, the schematic 200 illustrates a procedure for PHY PDU mapping on to SC-OFDM symbols. In other words, the schematic 2000 illustrates that the PUSSCH can be transmitted using a SC-FDMA transmission scheme. The MAC packet 2006 including MAC header is encoded and symbol mapped following a default modulation scheme. The MAC PDU 2006 is mapped into SC-FDMA symbols 2008 within a subframe. The MAC PDU 2004 is segmented into $N_s$ segments 2004. All the segments 2004 may or may not be of the same size. At least some of the segments 2004 are appended with a preamble 2006 and an SC-FDMA symbol 2008 is formed. A CP 2010 is added to the SC-FDMA symbols to account for the channel dispersion. An additional guard time 2012 may be added to account for time variations from different devices. In general, the SC-FDMA symbols per frame may be arbitrarily selected to optimize the spectral efficiency. Another alternative may be to select the design parameters to minimize or otherwise reduce the changes to the existing LTE transceiver. The following Table 2 gives the insight into various aspects of the RRU design.

TABLE 2

Design Parameters and Criteria for PUSSCH in SC-FDMA

Parameters

| | |
|---|---|
| Signal bandwidth of RRU (including the Guard band) | 180 kHZ |
| Number of OFDM symbols in 1 ms | $N_s$ |
| Guard time | $G_T$ |
| Duration of CP | $T_{CP}$ |
| Time duration of PHY payload segment | $T_{OFDM}$ |

Figure 21:
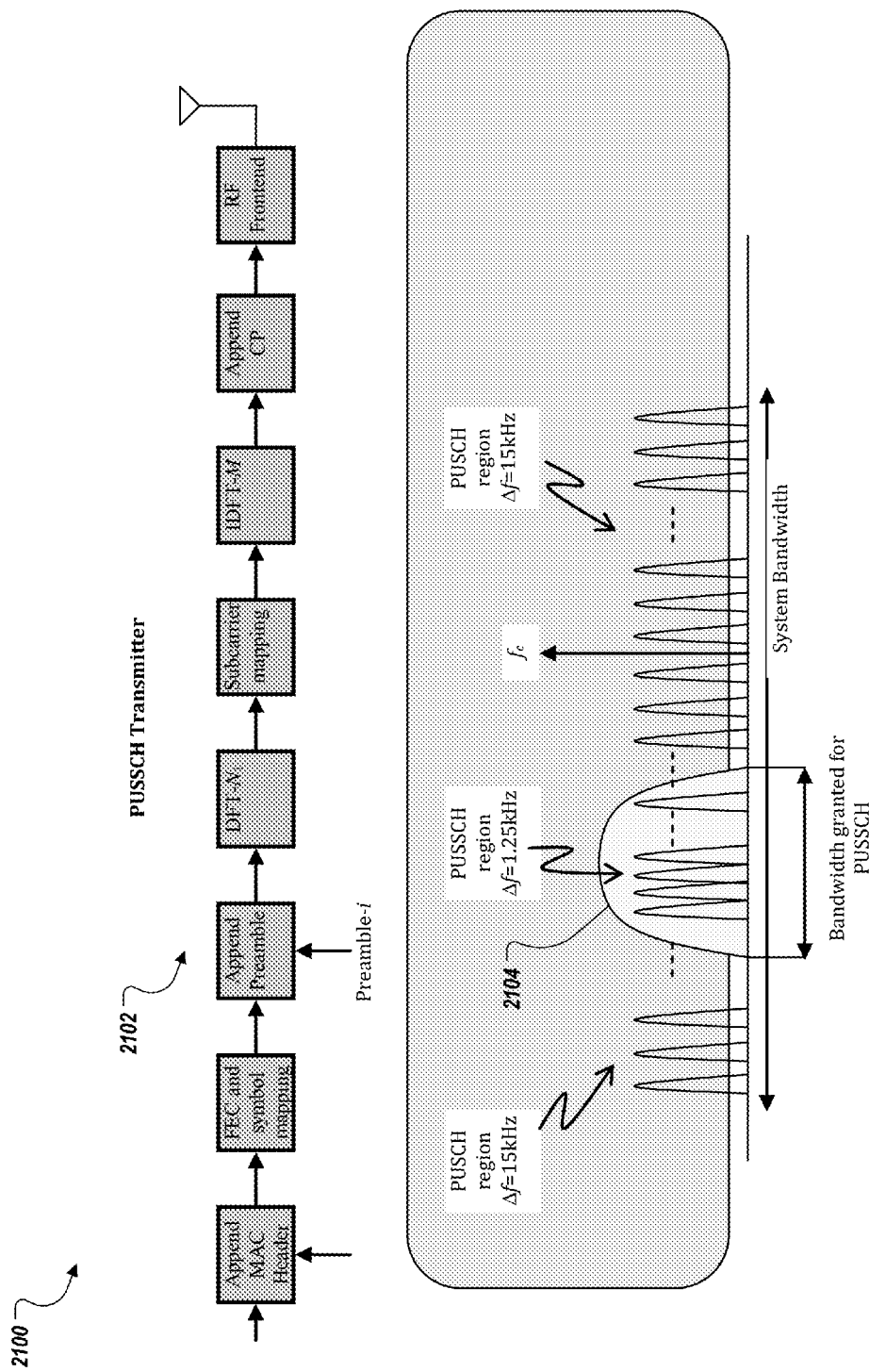
FIG. 21 is a schematic showing the operation and organization of an example PUS SCH transmitter.

Design criteria:

$N_s(T_{CP} + T_{OFDM}) + G_T = 1$ ms $T_{OFDM} = \frac{1}{\Delta f}$ $T_{CP} > \tau_m + \tau_D$ $G_T > \tau_D$ $\Delta f$ is the subcarrier spacing
$\tau_m$ and $\tau_D$ are the maximum channel delay dispersion and the maximum time offset expected from the UE transmission FIG. 21 is a schematic 2100 illustrating operation of an example PUSSCH transmitter. The schematic 2100 depicts the transmitter for a special case when the subcarrier spacing is set to 1.25 kHz at a bandwidth grant 2104. The transmitter diagram 2102 illustrated a sequence of processes executed by the PUSSCH transmitter. This scenario has similarities to the existing RACH transmitter and receiver design, which may provide an advantage. This design may be preferable if the design impacts are to be minimized or otherwise reduced.

TABLE 3

Design Parameters and Criteria for PUSSCH in SC-FDMA Scenario 1

Parameters

| | |
|---|---|
| Signal bandwidth of RRU (including the Guard band) | 180 kHz |
| Number of OFDM symbols in 1 ms | 1 |
| Guard time | 0.2 ms-$T_{CP}$ |
| Duration of CP | Select based on the expected $\tau_m$ and $\tau_D$ |
| Time duration of PHY payload segment | 0.8 ms |
| Payload size | 119 bits (95 symbols data + 24 symbols preamble) |
| $G_B$ | 15.625 kHz |

The packet may be further appended by a unique preamble sequence of length 22 symbols and discrete Fourier transform (DFT) precoded. The length of the DFT precoder may be 119 symbols. The DFT precoded symbols are mapped onto the assigned subcarriers. The subcarrier spacing is set to $\Delta f_c = 1.25$ kHz (as opposed to 15 kHz subcarrier spacing). The time domain signal may be obtained after performing IDFT of length M, where M=12*2048 for a 20 MHz LTE system bandwidth (1024*12 for a 10 MHz system bandwidth). The signal may be appended with a CP before transmission. Since the rest of the subcarriers are set to zero, this operation can be simplified.

In an alternate proposal, multiple SC-FDMA symbols may be transmitted in the allocated resource region of (180 kHz*1 ms). In this scheme, the current LTE UL frame structure and reference signal design may be used for PUSSCH transmission. The configuration parameters are as shown in Table 4 below. This design is similar to the extended CP format of the existing LTE UL specification. One of the 12 OFDM symbols is not used to accommodate the guard time.

TABLE 4

Design Parameters and Criteria for PUSSCH in SC-FDMA Scenario 2

Parameters

| | |
|---|---|
| Signal bandwidth of RRU (including the Guard band) | 180 kHz |
| Number of OFDM symbols in 1 ms | 11 |
| Guard time | 83.33 μs |
| Duration of CP | 16.667 μs ($\tau_m + \tau_D$) |
| Time duration of PHY payload segment | 0.8 ms |
| Payload size | 132 (108 symbols data + 24 symbols preamble) |
| $G_B$ | 15.625 kHz |

As the PUSSCH is going to be a narrowband transmission for a UE, the UE power amplifier may have sufficient head room and PAPR may not be an issue. Thus, instead of an SC-FDMA transmission, an OFDM scheme can be used for PUSSCH transmission. Using an OFDM transmission, the DFT precoding in transmitter and IDFT decoding in the receiver are not executed, compared with using SC-FDMA. Also, the reference signal design may be different with this scheme.

Figure 22:
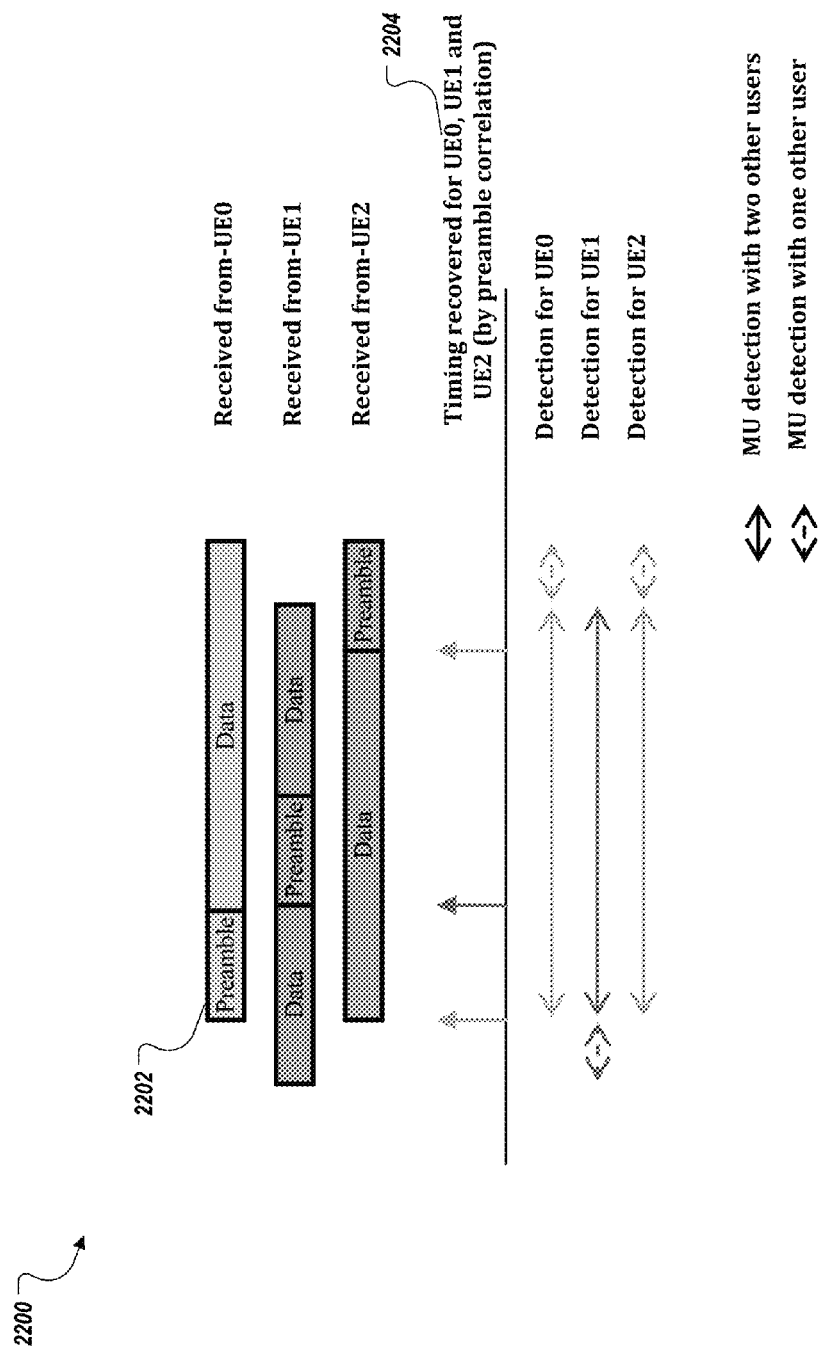
FIG. 22 is a schematic showing an example of a detection procedure for a PUSSCH with preamble/pilot sequence contention.
Figure 23:
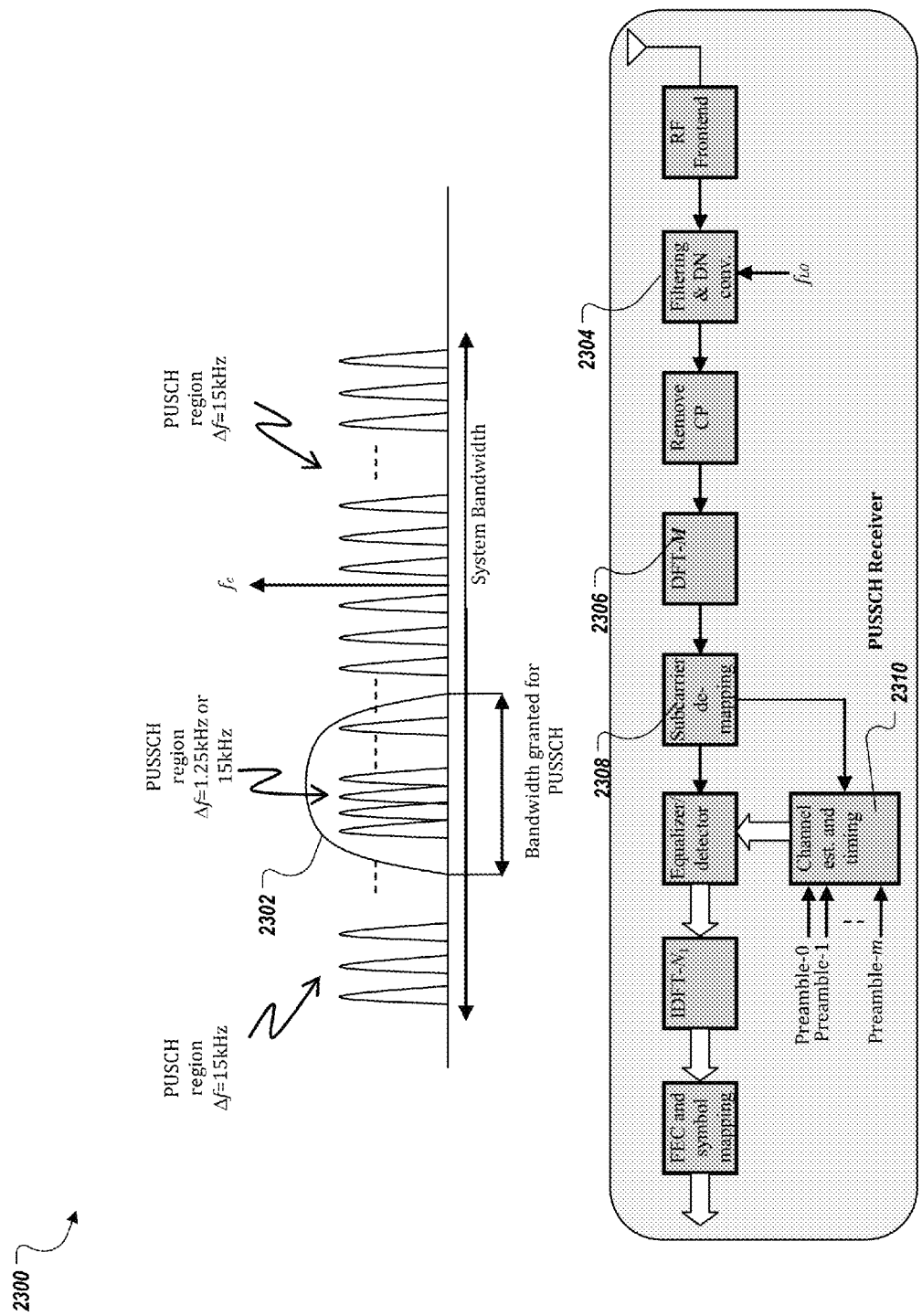
FIG. 23 is a schematic showing the operation and organization of an example PUSSCH receiver.
Figure 24:
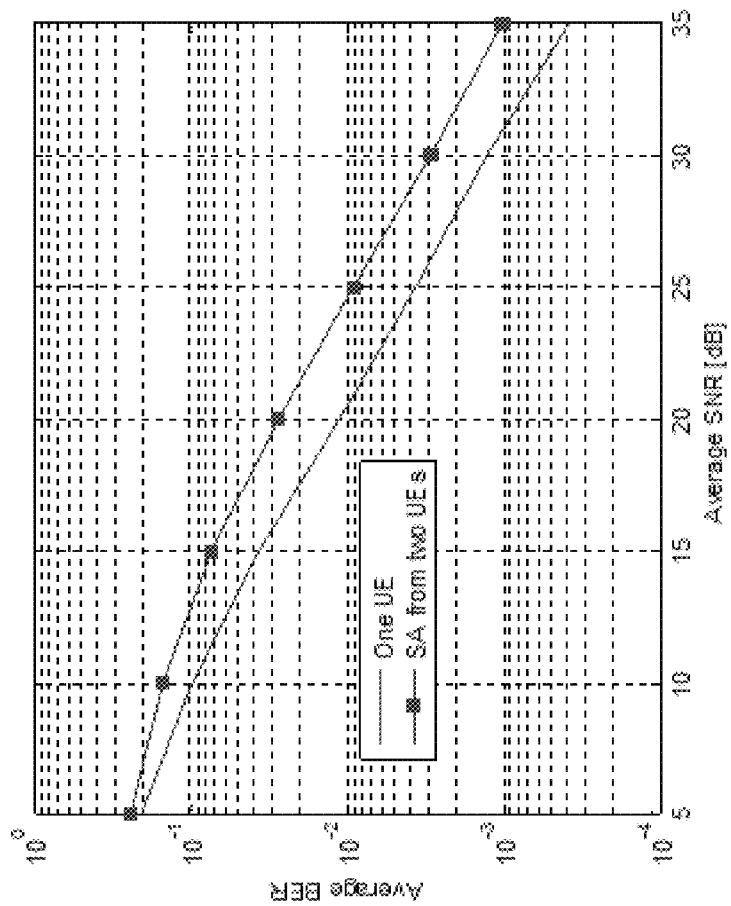
FIG. 24 is a graph illustrating example performance for OFDMA transmission scheme with simultaneous transmission from two UEs on the same RRU.

FIGS. 22-24 illustrate PUSSCH receiver processing. In general, there are a number of processing methods to separate collided transmissions. A contention based access solution with MUD for separating multiple UE transmissions may be utilized. Successive Interference Cancellation (SIC) mechanisms can also be employed to separate transmissions. As network nodes (e.g., eNBs) may be equipped with multiple antennas, MUD detection may be utilized. Using MUD, the receiver can detect a number of transmissions equal to the number of receive antennas. On using MUD coupled with maximum likelihood detection (MLD) or SIC, transmissions more than the number of receive antennas may be detected. Also, since robust MCS is used for PUSSCH, the complexity of joint MLD may be manageable for few users.

As described in the previous sections, since the UL transmissions from the UEs may not be perfectly synchronous in reaching the eNB, the received signal can be expressed as a sum of time shifted packets from N UEs.

$$r_k = \sum_{j=0}^{N-1} \sum_{l=0}^{D-1} c_l^j s_{k-l+\Delta_j}^j + n_k$$

Where $r_k$ and $n_k$ represent the kth sample of the received signal at the network node (e.g., eNB) and the kth sample of thermal noise plus other interference received at the network node respectively. $s_i^j$ represents the ith transmitted symbol from the jth UE. $\{c_l^j, l=0, \ldots, D-1\}$ are the channel coefficients of the channel between the jth UE and the network node. $\Delta_j$ represents the relative receive time difference between the jth UE and the 0th UE transmissions, i.e., $\Delta_0=0$. When $\Delta_j$ are significantly larger, i.e., of the order of multiple modulation symbols, the MU detection is challenging.

The detection of PUSSCH may be different from the known and existing multi-user detection schemes. In some examples, the data bursts transmitted by different UEs may arrive at different times at the receiver. The variation of the receive timings between various users may be within 1 ms for an LTE system coexisting with the transmissions. As mentioned earlier, the placement of preambles contained within the data bursts may be distributed across the data burst.

When detecting the multiple transmissions on the PUSSCH, the received base band signal may be correlated with the set of preambles to find the approximate timing of the PUSSCH data packet from each of the UEs. This correlation function may be performed either in time domain or frequency domain. For SC-FDMA or OFDMA transmissions, the received signal in the time domain may be correlated with the first C samples of an M point IDFT of the of zero-padded preamble or pilot sequence, where M is the length of the data packet including the preamble sequence and C is the length of the preamble sequence. For example, in the TDMA format, the correlator outputs may be expressed as follows:

$$g_k(m) = \sum_{l=0}^{C-1} r_{k+l} x_l^*(m) \text{ for } m = 0, 1, \ldots, M-1$$

Where $g_k(m)$ is the kth sample of the mth correlator. $\{x_l(m), l=0, 1, \ldots, C-1\}$ is the mth preamble sequence of length C. When $$|g_{k_0}(m)|^2 > \frac{\eta \|r_k\|^2}{M},$$

$k_0$ is declared as one of the candidate positions for the preamble sequence.

If more than one correlation peaks are detected separated by $\ll N_w T_s$, then a collision is declared. If the time separation is in the vicinity of $N_w T_s$, then the receiver proceeds to decode the data burst and check the CRC. The channel obtained by the preamble correlation is used to detect the data burst. Because of the time offset nature, the multi-user detection is performed in stages as illustrated in FIG. 22.

FIG. 22 is a schematic 2200 illustrating a detection procedure for PUSSCH with preamble/pilot sequence contention. A similar approach can be executed for SC-FDMA or OFDMA transmissions schemes. As illustrated, the received signal 2202 is cross correlated with a known preamble sequence at the receiver to recover the timing estimate of the burst 2204. Based on the total receiver power and the timing signal, the received signal may be decoded for each individual data bursts from each UE. As depicted, the knowledge of number interfering signal is taken into account when multi-user detection is performed. Normally, the received signal power from the two UEs should be very different to this to happen. The chances are low since the UE may still be adjusting their transmit powers according to open loop power control.

If multiple candidate positions are detected during correlation processing, a joint data detection and synchronization mechanism may be devised. The channel estimates at the candidate positions may be used to decode the data for each user. A reliability metric may be calculated on the detected information bits. The reliability metric may be a mean squared error or a log-likelihood function at the decoder output. The data set corresponding to the best reliability metric is declared as the most probable transmitted data packets from the UEs.

FIG. 23 is a schematic 2300 illustrating a PUSSCH receiver. For SC-FDMA based PUSSCH transmission, the received signal 2302 is down sampled and filtered at module 2304 to the assigned bandwidth. A M-length DFT is performed at module 2306 on the filtered signal before the subcarriers assigned to the PUSSCH are de-mapped at module 2308. The transmitted preambles are used to estimate the channel weights and timing at module 2310. A Multi User Frequency Domain Equalizer (MU-FDE) detector with the estimated channel weights can be used to extract the data packets transmitted by the UEs.

FIG. 24 is a graph 2400 illustrating raw bit error rate (BER) performance for OFMDA transmission scheme with simultaneous transmission from two UEs on the same RRU. As a comparison, performance results for one UE transmission (i.e., dedicated) are also shown. For these simulations, the channel weights are assumed to be perfectly known at the receiver. One transmit antenna at the UE and one receive antenna at the eNB was consider. The channel considered in these simulations is an EPA channel model as defined in 3GPP. Furthermore, the different preambles transmitted by the UEs are assumed to be synchronized. The transmitted bursts are assumed to be received in synchronization at the receiver. The average received powers from each UE's transmissions are equal. As illustrated in the graph 2400, the received average SNR for two UEs is calculated as the total receiver power from the two UEs with respect to the noise power spectral density of the receiver.

Figure 25:
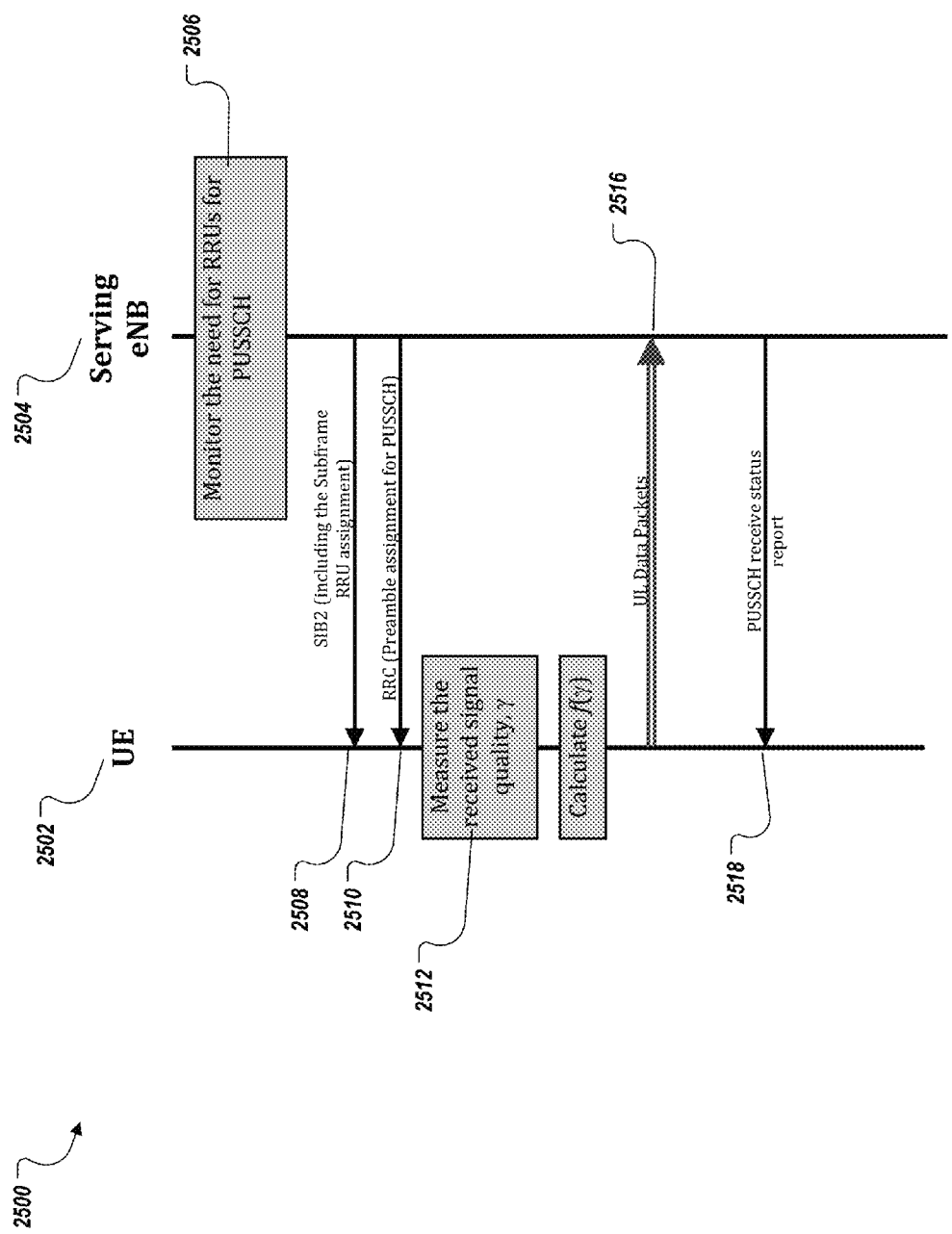
FIG. 25 is a call flow illustrating an example of a signaling sequence to set up and enable wireless transmission of data using PUSSCH.

In regard to signaling to support PUSSCH, FIG. 25 is a call flow 2500 illustrating a typical signaling sequence for setting up and enabling wireless transmission of data using PUSSCH. The serving eNB 2504 may monitor the resource assignment requirements for UE 2502 with small packet transmission at step 2506. The UEs may be informed of the resource assignment within the serving cell area in a broadcasted system information broadcast (SIB) message at step 2508 (this may be included in the existing SIB-2). The SIB2 content may include one or more of the following: The subframe pattern of length 10N bits; Index corresponding to the function f(γ); PUSSCH RRU assignment in the subframe; $\Delta_{GT}$, indicating the Guard time in sampling time units;

Following the SIB message at step 2510, the eNB may send a RRC message (RRC reconfiguration message) assigning a preamble sequence. The PUSSCH setup procedure may be repeated periodically from time to time by the serving eNB. For example, at the initial stage, the serving eNB may set the resources based on the types of the UE and their location. Later, at step 2512, the radio resource assignment may be fine-tuned by monitoring the packet losses or collisions (or collisions which were not recoverable). The preamble sequence sent in the RRC message may request for multi-user packet transmission to use the same set of physical resources. Upon receiving the SIB and RRC messages, the UE may determine the specific radio blocks to transmit packets at step 2516. In response to transmitting, the UE may receive a PUSSCH status report from the serving eNB at step 2518.

While several implementations have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

While the above detailed description has shown, described, and pointed out the fundamental novel features of the disclosure as applied to various implementations, it will be understood that various omissions and substitutions and changes in the form and details of the system illustrated may be made by those skilled in the art, without departing from the intent of the disclosure. In addition, the order of method steps not implied by the order they appear in the claims.

What is claimed is:

1. A method in a wireless network, the method comprising:
   allocating one or more radio resource units for a first physical shared channel in an uplink radio resource to a plurality of transmitters, wherein the uplink radio resource includes the first physical shared channel and a Physical Uplink Shared Channel (PUSCH), the first physical shared channel is a Physical Uplink Simultaneous-access Shared Channel (PUSSCH) configured for simultaneously transmitting and receiving user data, the PUSSCH is different than a PUSCH, and the plurality of radio transmitters are transmitting over the first physical shared channel with varying transmission delays.

2. The method of claim 1, wherein allocating the one or more radio resource units for the first physical shared channel in the uplink radio resource comprises broadcasting availability of the uplink radio resource including the first physical shared channel and associated selection criteria to the plurality of transmitters.

3. The method of claim 2, wherein the selection criteria for selecting the uplink radio resource includes multiple thresholds for the associated selection criteria.

4. The method of claim 2, wherein the associated selection criteria is based on at least one of received signal power, received signal to noise plus interference ratio, a location of a transceiver, speed of the transceiver, or an application descriptor.

5. The method of claim 4, wherein the associated selection criteria is the application descriptor, and the application descriptor includes at least one of an indication of an expected application packet or a packet session length and a packet or a packet session arrival rate.

6. The method of claim 5, wherein the indication is based on at least one of a mean packet length, variance, or maximum packet length, and the packet or the packet session arrival rate is based on at least one of a mean arrival rate, a variance of packet arrival rate, or maximum inter-packet arrival time.

7. The method of claim 2, further comprising sending a dedicated message to each of the plurality of transmitters assigning an identity of the uplink radio resource.

8. The method of claim 7, wherein the identity of the uplink radio resource comprises at least one of a preamble sequence or a position of the preamble sequence within a transmission payload.

9. The method of claim 2, further comprising sending a broadcast message to the plurality of transmitters a list of allowed identities of the uplink radio resource.

10. A method in a wireless network, the method comprising:
    receiving, from a plurality of transmitters, user data bursts with varying transmission delays transmitted over an allocated one or more radio resource units for a first physical shared channel in an uplink radio resource with varying resource identities, wherein the uplink radio resource includes the first physical shared channel and a Physical Uplink Shared Channel (PUSCH), the first physical shared channel is a Physical Uplink Simultaneous-access Shared Channel (PUS SCH) configured for simultaneously transmitting and receiving user data, and the PUSSCH is different than a PUSCH.

11. The method of claim 10, further comprising:
    receiving a burst of data packets within a subframe duration, wherein preamble bits of at least one preamble are spread across the burst of data packets; and
    reconstructing a physical layer protocol data unit (PHY PDU) based on the burst of data packets.

12. The method of claim 10, wherein the PUSSCH is a shared channel configured for simultaneously transmitting user data on shared resources with varying transmission delays.

13. The method of claim 12, wherein receiving the user data bursts includes receiving, from a first transmitter of the plurality of transmitters, a Single Carrier-Frequency Division Multiple Access (SC-FDMA) symbol in the PUSSCH with a standard cyclic prefix (CP) of a specified size indicating the first transmitter is stationary.

14. The method of claim 13, further comprising receiving, for a second transmitter of the plurality of transmitters, an SC-FDMA symbol in the PUS SCH with an extended CP larger than the standard CP and indicating the second transmitter is moving.

15. The method of claim 12, further comprising:
    receiving a burst of SC-FDMA symbols in the PUSSCH, each the SC-FDMA symbols including a guard period, a CP, and a payload, and a subset of the SC-FDMA symbols including a preamble; and
    reconstructing a MAC PDU based on the burst of data packets.

16. The method of claim 12, further comprising:
    detecting a collision of multiple transmissions on a single resource in the PUSSCH; and
    separating the multiple transmissions using Multi User Detection (MUD) or Successive Interference Cancellation (SIC) combined with maximum likelihood detection (MLD).

17. A network node, comprising:
    one or more processors configured to:
    allocate one or more radio resource units for a first physical shared channel in an uplink radio resource to a plurality of radio transmitters, wherein the uplink radio resource includes the first physical shared channel and a Physical Uplink Shared Channel (PUSCH), the first physical shared channel is a Physical Uplink Simultaneous-access Shared Channel (PUSSCH) configured for simultaneously transmitting and receiving user data, the PUSSCH is different than a PUSCH, and the plurality of radio transmitters are transmitting over the first physical shared channel with varying transmission delays.

18. The network node of claim 17, wherein the processor configured to allocate the one or more radio resource units for the first physical shared channel in the uplink radio resource comprises the processors configured to broadcast availability of the uplink radio resources including the first physical shared channel and associated selection criteria to the plurality of transmitters.

19. The network node of claim 17, wherein the selection criteria for selecting the uplink radio resource includes multiple thresholds for the associated selection criteria.

20. The network node of claim 18, wherein the associated selection criteria is based on at least one of received signal power, received signal to noise plus interference ratio, a location of a transceiver, speed of the transceiver, or an application descriptor.

21. The network node of claim 20, wherein the associated selection criteria is the application descriptor, and the application descriptor includes at least one of an indication of an expected application packet or a packet session length and a packet or a packet session arrival rate.

22. The network node of claim 21, wherein the indication is based on at least one of a mean packet length, variance, or maximum packet length, and the packet or the packet session arrival rate is based on at least one of a mean arrival rate, a variance of packet arrival rate, or maximum inter-packet arrival time.

23. The network node of claim 18, the processors further configured to send a dedicated message to each of the plurality of transmitters assigning an identity of the uplink radio resource.

24. The network node of claim 23, wherein the identity of the uplink radio resource comprises at least one of a preamble sequence or a position of the preamble sequence within a transmission payload.

25. The network node of claim 18, further comprising sending a broadcast message to the plurality of transmitters a list of allowed identities of the uplink radio resource.

26. The network node of claim 18, the processors further configured to:
determine a receive status for each preamble sequence; and
broadcast the receive status in a future transmission instant.

27. The network node of claim 26, wherein the receive status comprises one of; a successful detection of the preamble sequence and associated data; successful detection of the preamble sequence and unsuccessful detection of associated data; or unsuccessful detection of both the preamble sequence and associated data.

28. The network node of claim 27, the receiver status further comprises an indication of whether the preamble sequence is reserved for a future transmission.

29. A receiver, comprising:
one or more processors configured to:
receive, from a plurality of transmitters, user data bursts with varying transmissions delays transmitted over an allocated one or more radio resource units for a first physical shared channel in an uplink radio resource with varying resource identities, wherein the uplink radio resource includes the first physical shared channel and a Physical Uplink Shared Channel (PUSCH), the first physical shared channel is a Physical Uplink Simultaneous-access Shared Channel (PUS SCH) configured for simultaneously transmitting and receiving user data, and the PUSSCH is different than a PUSCH.

30. The receiver of claim 29, the processors further configured to:
receive a burst of data packets within a subframe duration, wherein preamble bits of at least one preamble are spread across the burst of data packets; and
reconstruct a PHY PDU based on the burst of data packets.

31. The receiver of claim 29, wherein the PUSSCH is a shared channel configured for simultaneously transmitting user data on shared resources with varying transmission delays.

32. The receiver of claim 31, wherein the processors configured to receive the user data bursts includes the processors further configured to receive, from a first transmitter of the plurality of transmitters, a Single Carrier-Frequency Division Multiple Access (SC-FDMA) symbol in the PUS SCH with a standard cyclic prefix (CP) of a specified size indicating the first transmitter is stationary.

33. The receiver of claim 32, the processors further configured to receive, for a second transmitter of the plurality of transmitters, an SC-FDMA symbol in the PUS SCH with an extended CP larger than the standard CP and indicating the second transmitter is moving.

34. The receiver of claim 31, the processors further configured to:
receive a burst of SC-FDMA symbols in the PUSSCH, each the SC-FDMA symbols including a guard period, a CP, and a payload, and a subset of the SC-FDMA symbols including a preamble; and
reconstruct a MAC PDU based on the burst of data packets.

35. The receiver of claim 31, the processors further configured to:
detect a collision of multiple transmissions on a single resource in the PUSSCH; and
separate the multiple transmissions using MUD or SIC combined with MLD.

\* \* \* \* \*

UNITED STATES PATENT AND TRADEMARK OFFICE
CERTIFICATE OF CORRECTION

| | |
|---|---|
| PATENT NO. | : 9,800,377 B2 |
| APPLICATION NO. | : 15/153374 |
| DATED | : October 24, 2017 |
| INVENTOR(S) | : Chandra Sekhar Bontu et al. |

Page 1 of 1

It is certified that error appears in the above-identified patent and that said Letters Patent is hereby corrected as shown below:

In the Claims

In Column 24, Line 5, In Claim 10, delete "(PUS SCH)" and insert -- (PUSSCH) --, therefor.

In Column 24, Line 27, In Claim 14, delete "PUS SCH" and insert -- PUSSCH --, therefor.

In Column 26, Line 7, In Claim 29, delete "(PUS SCH)" and insert -- (PUSSCH) --, therefor.

In Column 26, Line 26, In Claim 32, delete "PUS SCH" and insert -- PUSSCH --, therefor.

In Column 26, Line 30, In Claim 33, delete "PUS SCH" and insert -- PUSSCH --, therefor.

Signed and Sealed this
Ninth Day of October, 2018

Andrei Iancu
*Director of the United States Patent and Trademark Office*